(12) United States Patent
Chaugule et al.

(10) Patent No.: US 11,678,172 B2
(45) Date of Patent: Jun. 13, 2023

(54) ON-DEVICE ENROLLMENT IN A CELLULAR ADD-ON PLAN

(71) Applicant: Apple Inc., Cupertino, CA (US)

(72) Inventors: Raj Sukumar Chaugule, Santa Clara, CA (US); Li Li, Los Altos, CA (US); Sherman Xu Jin, Santa Clara, CA (US); Nai Tao Cui, Mississauga (CA); Samy Touati, Pleasanton, CA (US); Bhogeswara Rao Metta, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 130 days.

(21) Appl. No.: 17/230,987

(22) Filed: Apr. 14, 2021

(65) Prior Publication Data
US 2022/0232370 A1    Jul. 21, 2022

Related U.S. Application Data

(60) Provisional application No. 63/138,319, filed on Jan. 15, 2021.

(51) Int. Cl.
| | |
|---|---|
| *H04W 24/08* | (2009.01) |
| *H04W 8/20* | (2009.01) |
| *H04W 4/50* | (2018.01) |
| *H04W 8/18* | (2009.01) |

(52) U.S. Cl.
CPC .............. *H04W 8/205* (2013.01); *H04W 4/50* (2018.02); *H04W 8/183* (2013.01)

(58) Field of Classification Search
None
See application file for complete search history.

(56) References Cited

U.S. PATENT DOCUMENTS

| | | | |
|---|---|---|---|
| 10,142,868 B2 * | 11/2018 | Mohammed | .......... H04M 15/46 |
| 2019/0082340 A1 * | 3/2019 | Mohammed | ...... H04M 15/8016 |

* cited by examiner

*Primary Examiner* — Gary Lafontant
(74) *Attorney, Agent, or Firm* — Fish & Richardson P.C.

(57) ABSTRACT

Techniques for on-device enrollment of a secondary wireless device in an add-on cellular plan include receiving, at the secondary wireless device, cellular plan information for a cellular plan of a primary wireless device associated with the secondary wireless device. Based on the cellular plan information, the secondary wireless device displays an option to add the secondary wireless device to the cellular plan of the primary wireless device. A selection of the option to add the secondary wireless device to the cellular plan of the primary wireless device is received, and a request is transmitted to the primary wireless device for enrollment information for enrolling the secondary wireless device in an add-on plan of the cellular plan. The enrollment information, which includes a list of available add-on plans for the secondary wireless device or information associated with a provider of the cellular plan, is received at the secondary wireless device.

20 Claims, 25 Drawing Sheets

ON-DEVICE ENROLLMENT IN A CELLULAR ADD-ON PLAN

CROSS-REFERENCE TO RELATED APPLICATIONS

This application claims priority to and the benefit of U.S. Provisional Patent Application No. 63/138,319, filed Jan. 15, 2021, the entire content of which is incorporated herein by reference.

TECHNICAL FIELD

This disclosure relates generally to techniques for enrolling a wireless device in a cellular add-on plan.

BACKGROUND

A mobile network operator, or carrier, is an organization that provides wireless voice and data communication services. To use these services, a user subscribes to the carrier by, for example, purchasing a cellular plan from the carrier. Once subscribed, the user can activate a wireless device with the carrier and use the wireless device on the carrier's network in accordance with the cellular plan.

SUMMARY

In general, in a first aspect, a method for on-device enrollment of a secondary wireless device in an add-on cellular plan includes: receiving, at the secondary wireless device, cellular plan information for a cellular plan of a primary wireless device associated with the secondary wireless device; based at least in part on the cellular plan information, displaying, on the secondary wireless device, an option to add the secondary wireless device to the cellular plan of the primary wireless device; receiving, at the secondary wireless device, a selection of the option to add the secondary wireless device to the cellular plan of the primary wireless device; transmitting a request to the primary wireless device for enrollment information for enrolling the secondary wireless device in an add-on plan of the cellular plan; and receiving, from the primary wireless device, the enrollment information, in which the enrollment information includes a list of available add-on plans for the secondary wireless device or information associated with a provider of the cellular plan.

In general, in a second aspect combinable with the first aspect, the method includes: receiving, at the secondary wireless device, user account information for a user account that is shared by the primary wireless device and the secondary wireless device; and retrieving the cellular plan information from a server based at least in part on the user account information.

In general, in a third aspect combinable with the first or second aspects, the cellular plan information includes eligibility information indicating that the secondary wireless device is eligible to be added to the cellular plan of the primary wireless device.

In general, in a fourth aspect combinable with any of the first through third aspects, the cellular plan information includes a carrier of the cellular plan or a phone number of the primary wireless device.

In general, in a fifth aspect combinable with any of the first through fourth aspects, the primary wireless device is configured to execute one or more application programming interface (API) calls to a carrier server to retrieve the enrollment information in response to the request for the enrollment information.

In general, in a sixth aspect combinable with any of the first through fifth aspects, the method includes: displaying, on the secondary wireless device, the list of available add-on plans; receiving, at the secondary wireless device, a selection of an add-on plan from the list of available add-on plans; and transmitting a request to the primary wireless device to enroll the secondary wireless device in the selected add-on plan.

In general, in a seventh aspect, combinable with any of the first through sixth aspects, the method includes: receiving, at the secondary wireless device, an embedded subscriber identity module (eSIM) profile in response to enrollment of the secondary wireless device in the selected add-on plan.

In general, in an eighth aspect combinable with any of the first through seventh aspects, wherein the information associated with the provider of the cellular plan includes a websheet for the provider of the cellular plan, the method including: in response to receiving the selection of the add-on, displaying, on the secondary wireless device, a prompt to the user to consent to enrollment of the secondary wireless device in the selected add-on plan on the primary wireless device.

In general, in a ninth aspect combinable with any of the first through eighth aspects, the method includes: displaying, on the secondary wireless device, the websheet for the provider of the cellular plan and, in response to completion of the websheet, executing a callback function to trigger installation of an eSIM profile on the secondary wireless device.

In general, in a tenth aspect combinable with any of the first through ninth aspects, the method includes: transmitting a request to a server for the enrollment information for enrolling the wireless device in an add-on plan of the cellular plan, the request including at least some of the cellular plan information for the cellular plan of the primary wireless device, and receiving, from the server, the enrollment information.

In general, in an eleventh aspect combinable with any of the first through tenth aspects, the server is configured to apply one or more business rules to determine whether the wireless device is eligible to be enrolled in the add-on plan of the cellular plan.

In general, in a twelfth aspect combinable with any of the first through eleventh aspects, the method includes: receiving a filtered list of available add-on plans for the secondary wireless device produced by applying one or more filters to the list of available add-on plans, the one or more filters including a filter based on a freshness of the primary wireless device or a filter based on an active cellular plan of the primary wireless device, and displaying the filtered list of available add-on plans.

In general, in a thirteenth aspect combinable with any of the first through twelfth aspects, the method includes: after enrollment of the wireless device in an add-on plan of the cellular plan, transmitting a request to a server for account information for the add-on plan, and receiving, from the server, the account information, the account information including an indication of data usage for the add-on plan or information to access an account with a provider of the add-on plan.

In general, in a fourteenth aspect, a wireless device includes one or more processors configured to perform operations according to the method of any of the first through thirteenth aspects.

In general, in a fifteenth aspect, a non-transitory computer-readable medium includes instructions which, when executed by one or more processors, cause the one or more processors to perform operations according to any of the first through thirteenth aspects.

In general, in a sixteenth aspect, a method for on-device enrollment of a secondary wireless device in an add-on cellular plan includes: transmitting, by a primary wireless device associated with the secondary wireless device, cellular plan information for a cellular plan of the primary wireless device; receiving, at the primary wireless device, a request for enrollment information for enrolling the secondary wireless device in an add-on plan of the cellular plan; transmitting a request to a server for the enrollment information; receiving, at the primary wireless device, the enrollment information, in which the enrollment information includes a list of available add-on plans for the secondary wireless device or information associated with a provider of the cellular plan; and transmitting the enrollment information to the secondary wireless device.

In general, in a seventeenth aspect combinable with the sixteenth aspect, the method includes: receiving, at the primary wireless device, user account information for a user account that is shared by the primary wireless device and the secondary wireless device; and transmitting the cellular plan information to a server, in which the secondary wireless device is configured to retrieve the cellular plan information from the server based at least in part on the user account information.

In general, in an eighteenth aspect combinable with the sixteenth or seventeenth aspects, the cellular plan information includes a carrier of the cellular plan or a phone number of the primary wireless device.

In general, in a nineteenth aspect combinable with any of the sixteenth through eighteenth aspects, the method includes: executing, by the primary wireless device, one or more API calls to a carrier server obtain eligibility information indicating that the secondary wireless device is eligible to be added to the cellular plan of the primary wireless device.

In general, in a twentieth aspect combinable with any of the sixteenth through nineteenth aspects, the method includes: in response to the request for the enrollment information, executing, by the primary wireless device, an API call to a carrier server to obtain the list of available add-on plans for the secondary wireless device.

In general, in a twenty-first aspect combinable with the twentieth aspect, the API call includes a device type of the secondary wireless device.

In general, in a twenty-second aspect combinable with any of the sixteenth through twenty-first aspects, the information associated with the provider of the cellular plan includes a websheet for the provider of the cellular plan, the method including: in response to the request for the enrollment information, executing, by the primary wireless device, an API call to a carrier server to obtain a URL or post data for the web sheet for the provider of the cellular plan.

In general, in a twenty-third aspect combinable with the twenty-second aspect, the API call includes at least one of an integrated circuit card identifier (ICCID) for the primary wireless device, an embedded identity document (EID) for the secondary wireless device, an international mobile equipment identity (IMEI) for the secondary wireless device, or a device type of the secondary wireless device.

In general, in a twenty-fourth aspect combinable with any of the sixteenth through twenty-third aspects, the method includes: receiving a request to enroll the secondary wireless device in a selected add-on plan from the list of available add-on plans; and in response to the request, executing, by the primary wireless device, an API call to a carrier server to enroll the secondary wireless device in the selected add-on plan.

In general, in a twenty-fifth aspect combinable with the twenty-fourth aspect, the API call includes an identifier for the selected add-on plan and at least one of an ICCID for the primary wireless device, an EID for the secondary wireless device, an IMEI for the secondary wireless device, or a device type of the secondary wireless device.

In general, in a twenty-sixth aspect, a wireless device includes one or more processors configured to perform operations according to the method of any of the sixteenth through twenty-fifth aspects.

In general, in a twenty-seventh aspect, a non-transitory computer-readable medium includes instructions which, when executed by one or more processors, cause the one or more processors to perform operations according to the method of any of the sixteenth through twenty-fifth aspects.

In general, in a twenty-eighth aspect, a method includes: receiving, from a primary wireless device, a request to enroll a secondary wireless device in an add-on plan of a cellular plan of the primary wireless device; determining, based at least in part on one or more parameters of the request, whether the request is for native enrollment or non-native enrollment of the secondary wireless device; and in response to a determination that the request is for non-native enrollment of the secondary wireless device, transmitting, to the primary wireless device, a sign-up URL and post data for a carrier associated with the cellular plan In general, in a twenty-ninth aspect combinable with the twenty-eighth aspect, the method includes: in response to a determination that the request is for native enrollment of the secondary wireless device, enrolling the secondary wireless device in an add-on plan identified in the request.

In general, in a thirtieth aspect combinable with the twenty-eighth or twenty-ninth aspects, the method includes: determining whether the request is for native enrollment or non-native enrollment of the secondary wireless device based at least in part on the presence or absence of an add-on plan identifier in the request, in which presence of the add-on plan identifier in the request is indicative of native enrollment.

In general, in a thirty-first aspect combinable with any of the twenty-eighth through thirtieth aspects, the one or more parameters of the request include an ICCID of the primary wireless device, an EID of the secondary wireless device, an IMEI of the secondary wireless device, a device type for the secondary wireless device, or an add-on plan identifier.

In general, in a thirty-second aspect combinable with any of the twenty-eighth through thirty-first aspects, enrolling the secondary wireless device in the add-on plan includes triggering installation of an embedded subscriber identity module (eSIM) profile on the secondary wireless device.

In general, in a thirty-third aspect, a device includes one or more processors configured to perform operations according to any of the twenty-eighth through thirty-second aspects.

In general, in a thirty-fourth aspect, a non-transitory computer-readable medium includes instructions which, when executed by one or more processors, cause the one or more processors to perform operations according to any of the twenty-eighth through thirty-second aspects.

The details of one or more implementations are set forth in the accompanying drawings and the description below. The techniques described here can be implemented by one or more systems, devices, methods, or non-transitory computer-readable media, among others. Other features and advantages will be apparent from the description and drawings, and from the claims.

BRIEF DESCRIPTION OF DRAWINGS

Like reference symbols in the various drawings indicate like elements.

DETAILED DESCRIPTION

The techniques described here allow for on-device enrollment of a secondary wireless device as an add-on to a cellular plan of a primary wireless device. In an example, plan-related data for a cellular plan of the primary device is obtained by the secondary device through a shared user account. Based on the plan-related data, the secondary device presents an option to add the secondary device to the cellular plan of the primary device. In response to a selection to add the secondary device to the cellular plan, the secondary device communicates with the primary device or another system component to request information for enrollment in the plan, such as a list of the available add-on plans or a carrier websheet for completing enrollment. The user completes enrollment of the secondary device in the add-on plan by, for example, selecting an add-on plan displayed in a native user interface of the secondary device or using a carrier websheet displayed on the secondary device. Upon completion of the enrollment process, the secondary device is automatically activated for use on the carrier's cellular network in accordance with the add-on plan.

The enrollment techniques described here create a seamless user experience for adding a secondary device to a primary cellular subscription. Unlike some systems which require a user to visit a point of sale or otherwise interact with a representative in order to enroll the secondary device in an add-on plan, the techniques described here allow a user to complete the entire enrollment process on the secondary device (and, in some examples, with only one "click"). In addition, the enrollment process described here leverages plan-related data and other information that is shared between the primary device and the secondary device through the user account to reduce the amount of information that the user must provide during the enrollment process. Enabling enrollment of the secondary device in an add-on plan that is linked to the subscription of the primary device also allows the user to manage his or her cellular plan on both the primary and secondary devices, share billing and payment details across devices, and share data capacity across device subscriptions. The techniques described here give flexibility to carriers and device manufacturers to drive enrollment through either a native user interface or a websheet (e.g., an interactive web page that includes text and/or data).

Figure 1:
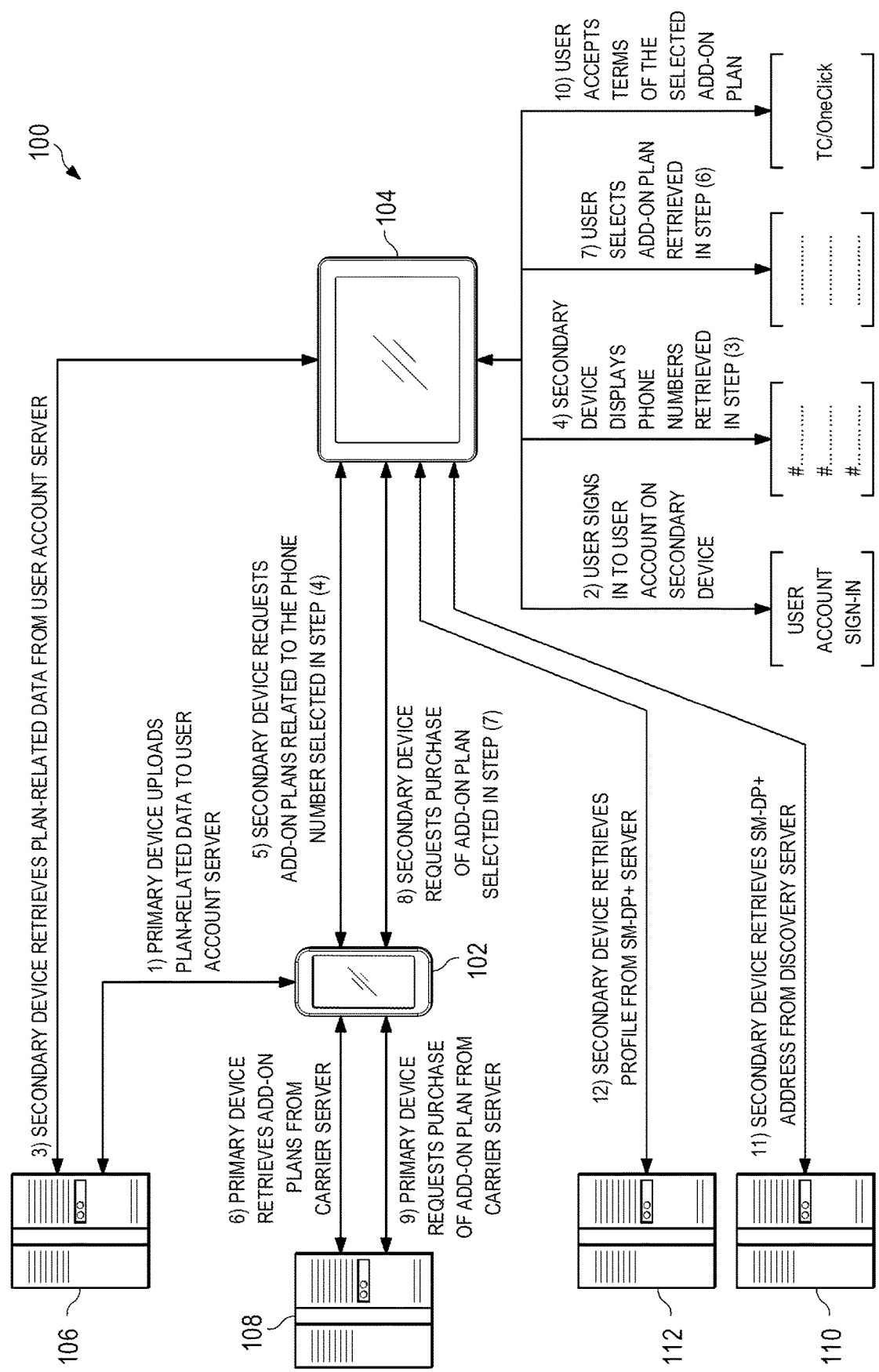
FIG. 1 illustrates an example system for on-device enrollment in a cellular add-on plan.

FIG. 1 illustrates an example of a system 100 for on-device enrollment in a cellular add-on plan. In this example, the system 100 includes a primary wireless device 102 that is associated with (e.g., activated on) an existing cellular plan, and a secondary wireless device 104 that is to be added to the cellular plan. The primary wireless device 102 and the secondary wireless device 104 can each be a substantially portable wireless computing device, such as a smart phone, a hand-held device, a wearable device (e.g., a smart watch), a tablet, or a laptop, among other portable wireless devices. The system 100 also includes a user account server 106, a carrier server 108, a discovery server 110, and a subscription manager data preparation (SM-DP or SM-DP+) server 112, each of which are described in detail below.

In operation, a user of the primary wireless device 102 signs in to a user account on the primary wireless device 102. The user account can be, for example, an account associated with an original equipment manufacturer (OEM) of the primary wireless device 102. Using the account information provided by the user, the primary wireless device 102 uploads information about the cellular plan for the primary wireless device 102 to the user account server 106, which can be a cloud storage server. The information about the cellular plan, sometimes referred to as "plan-related data," can include the mobile station international subscriber directory number (MSISDN), or phone number, for the primary wireless device 102, the carrier of the cellular plan for the primary wireless device 102, the integrated circuit card identifier (ICCID) associated with the primary wireless device 102, eligibility information for add-on plans obtained by the primary wireless device 102 from the carrier server 108, or combinations of them, among other information. The user account server 106 associates the plan-related data received from the primary wireless device 102 with the specified user account and securely stores it for later access.

To add the secondary wireless device 104 to the cellular plan of the primary wireless device 102 or another wireless device (not shown), the user signs in to his or her user account on the secondary wireless device 104. Once signed in, the secondary wireless device 104 automatically retrieves some or all of the plan-related data from the user account server 106. The secondary wireless device 104 displays the phone number(s), carrier(s), and/or other information discovered from the plan-related data to allow the user to select the cellular plan that the secondary wireless device 104 is to be added to.

In this example, the secondary wireless device 104 sends a message to the primary wireless device 102 (e.g., directly or over one or more networks) with a request for add-on plans related to the phone number selected by the user. In response, the primary wireless device 102 communicates with the carrier server 108 (e.g., through one or more application programming interface (API) calls) to retrieve the available add-on plans. In an example, the primary wireless device 102 retrieves information to access a websheet with the available plans from the carrier server 108, as described below.

After retrieving the available add-on plans from the carrier server 108, the primary wireless device 102 returns the plans to the secondary wireless device 104 for display. The user selects one of the displayed add-on plans, and the secondary wireless device 104 transmits a message to the primary wireless device 102 with a request to enroll the secondary wireless device 104 in the selected plan. The primary wireless device 102 communicates with the carrier server 108 (e.g., through one or more API calls) to complete enrollment of the secondary wireless device 104 in the selected add-on plan. In an example, the primary wireless device 102 causes the secondary wireless device 104 to display terms and conditions (TC) (or a websheet with TC) for the user to review and accept before enrolling the selected add-on plan.

Once the secondary wireless device 104 is enrolled in the cellular add-on plan, the secondary wireless device 104 can be activated on the carrier network. Activation of the secondary wireless device 104 can include subscriber identity module (SIM) provisioning such as the downloading, installing, enabling, disabling, switching and/or deleting of a profile on a universal integrated circuit card (UICC) or SIM card, or an embedded universal integrated circuit card (eUICC) or eSIM card of the secondary wireless device 104. In general, a profile stores user subscription information, network settings, and other information that allows the device to operate on the network.

To facilitate activation, the secondary wireless device 104 queries the discovery server 110 to retrieve the appropriate SM-DP+ (or SM-DP) address for the carrier of the add-on plan. The secondary wireless device 104 then uses this address to retrieve the profile from the SM-DP+ server 112 (or otherwise activate the secondary device 104). Once activated, the secondary wireless device 104 can operate on the cellular network provided by the carrier (not shown) in accordance with the add-on plan.

Figure 2:
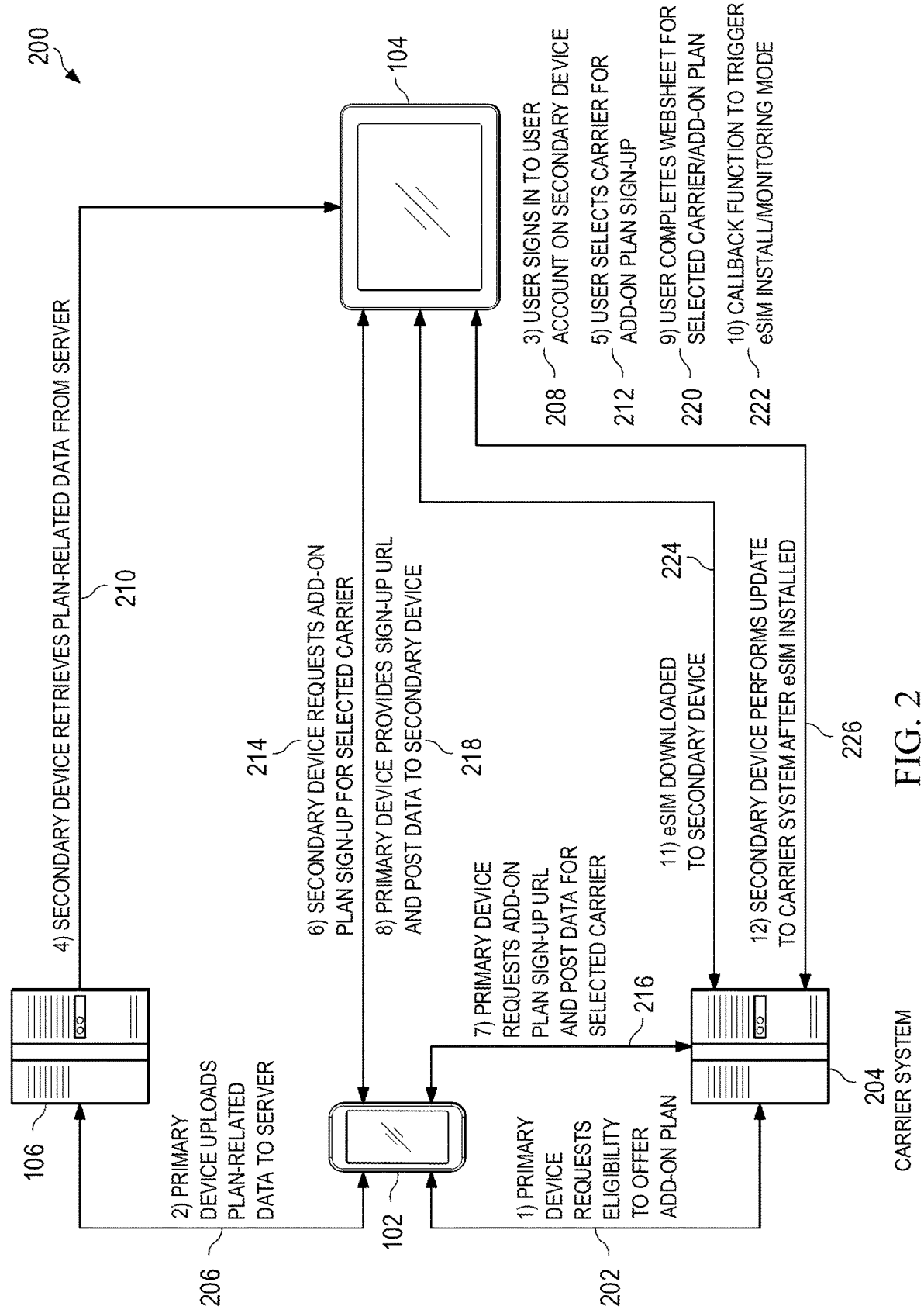
FIG. 2 illustrates an example process for non-native on-device enrollment in a cellular add-on plan.

FIG. 2 illustrates an example process 200 for non-native on-device enrollment in a cellular add-on plan. Initially, at 202, the primary wireless device 102 communicates with a carrier system 204 (e.g., through one or more API calls) to determine whether the cellular plan associated with the primary wireless device 102 is eligible to offer an add-on plan to the secondary wireless device 104. In general, the carrier system 204 can include the carrier server 108, the discovery server 110, and/or the SM-DP+ server 112, among others. The eligibility information received from the carrier system 204, as well as other plan-related data, is uploaded by the primary wireless device 102 to the user account server 106 at 206.

Figure 6A:
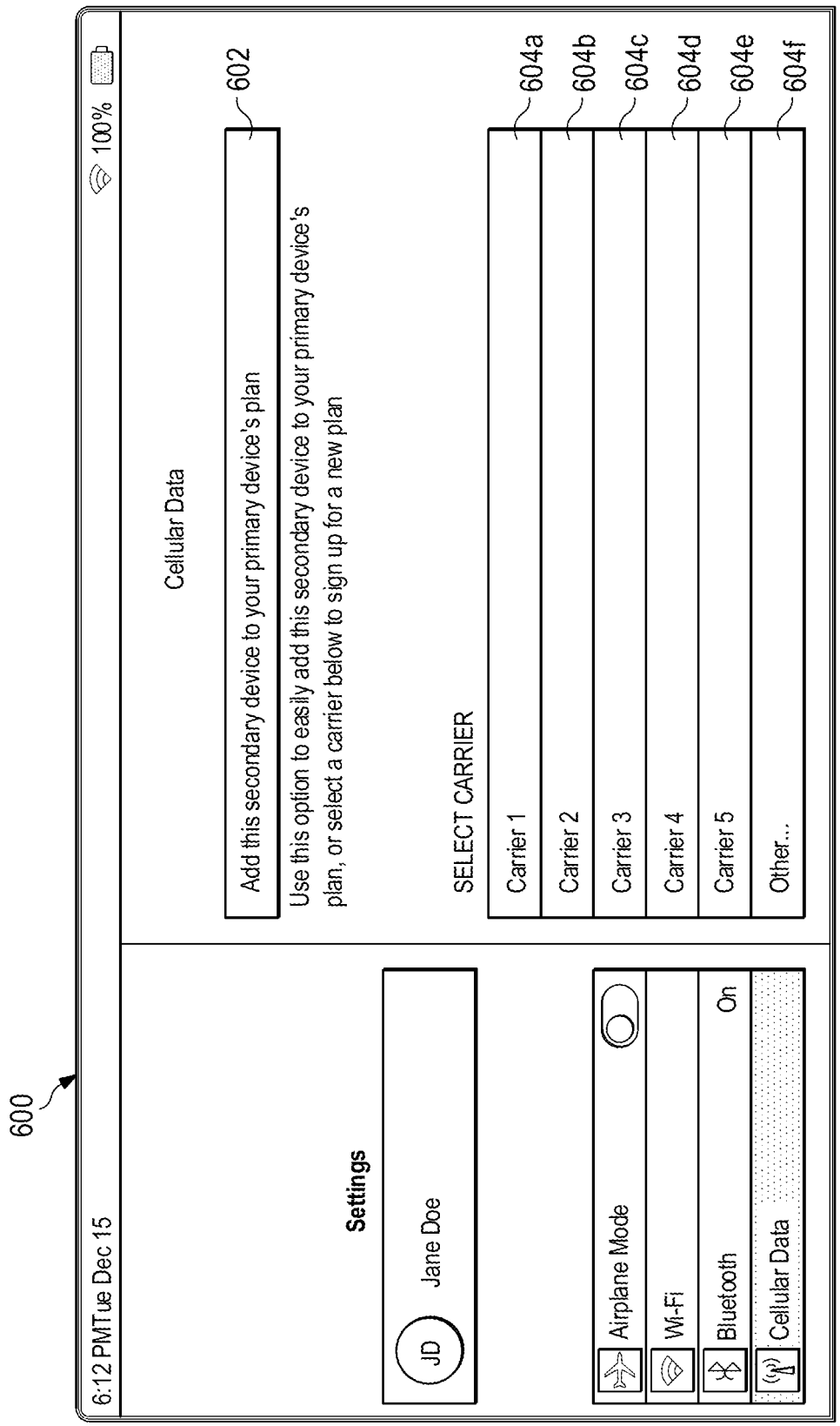
FIGS. 6A-6C illustrate example user interfaces for non-native on-device enrollment in an add-on plan.

At 208, the user signs in to his or her user account on the secondary wireless device 104, which prompts the secondary wireless device 104 to retrieve the plan-related data associated with the user account from the user account server 106 at 210. The secondary wireless device 104 displays some or all of the retrieved plan-related data to allow the user to select an add-on plan. For example, the secondary wireless device 104 can display an option to add the device to the cellular plan of the primary wireless device 102 (as well as other options to enroll with different carriers), as shown in FIG. 6A. In this example, the user selects a carrier (e.g., the carrier of the cellular plan for the primary wireless device 102) for add-on plan enrollment at 212.

Figure 6B:
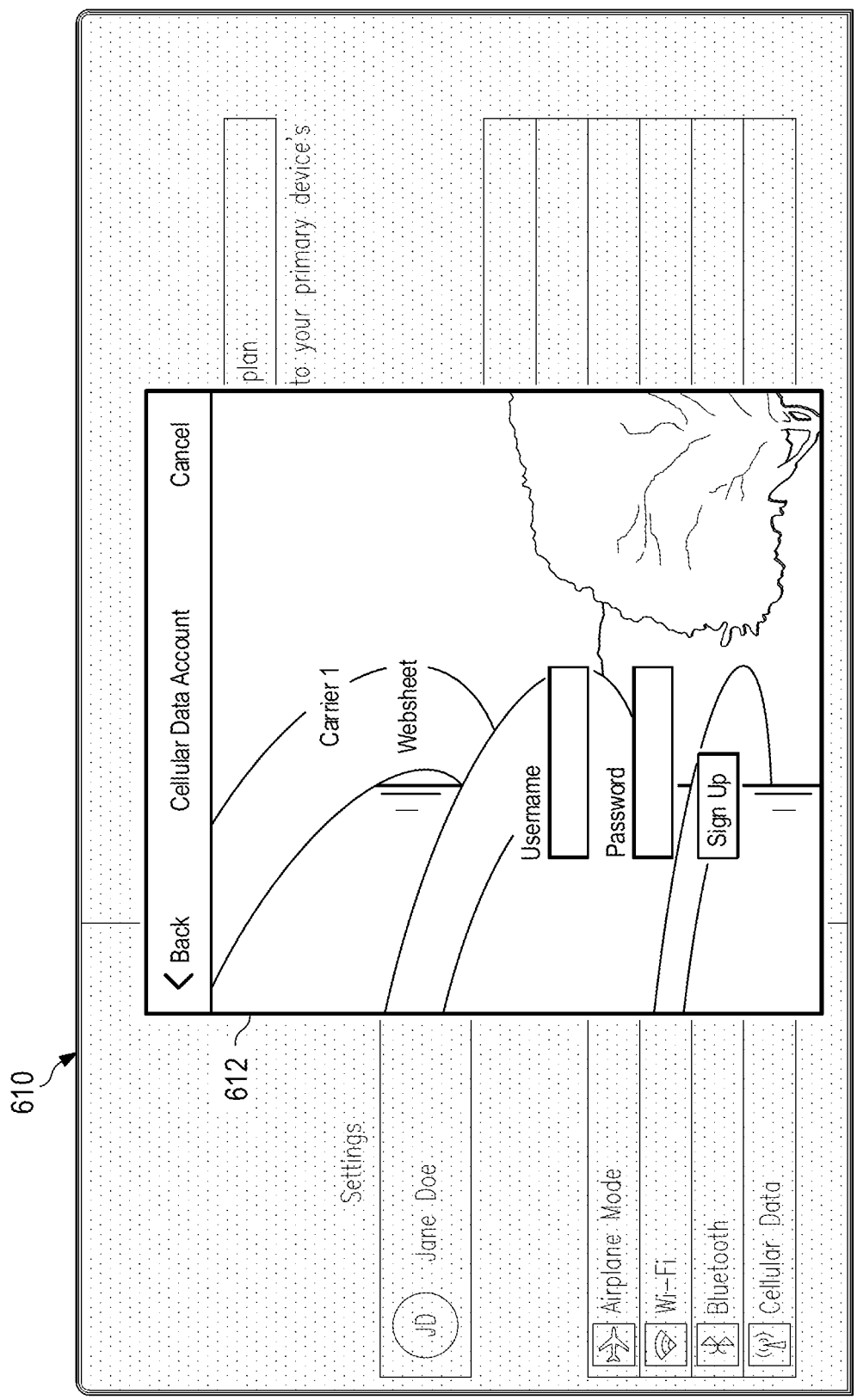
Figure 6C:
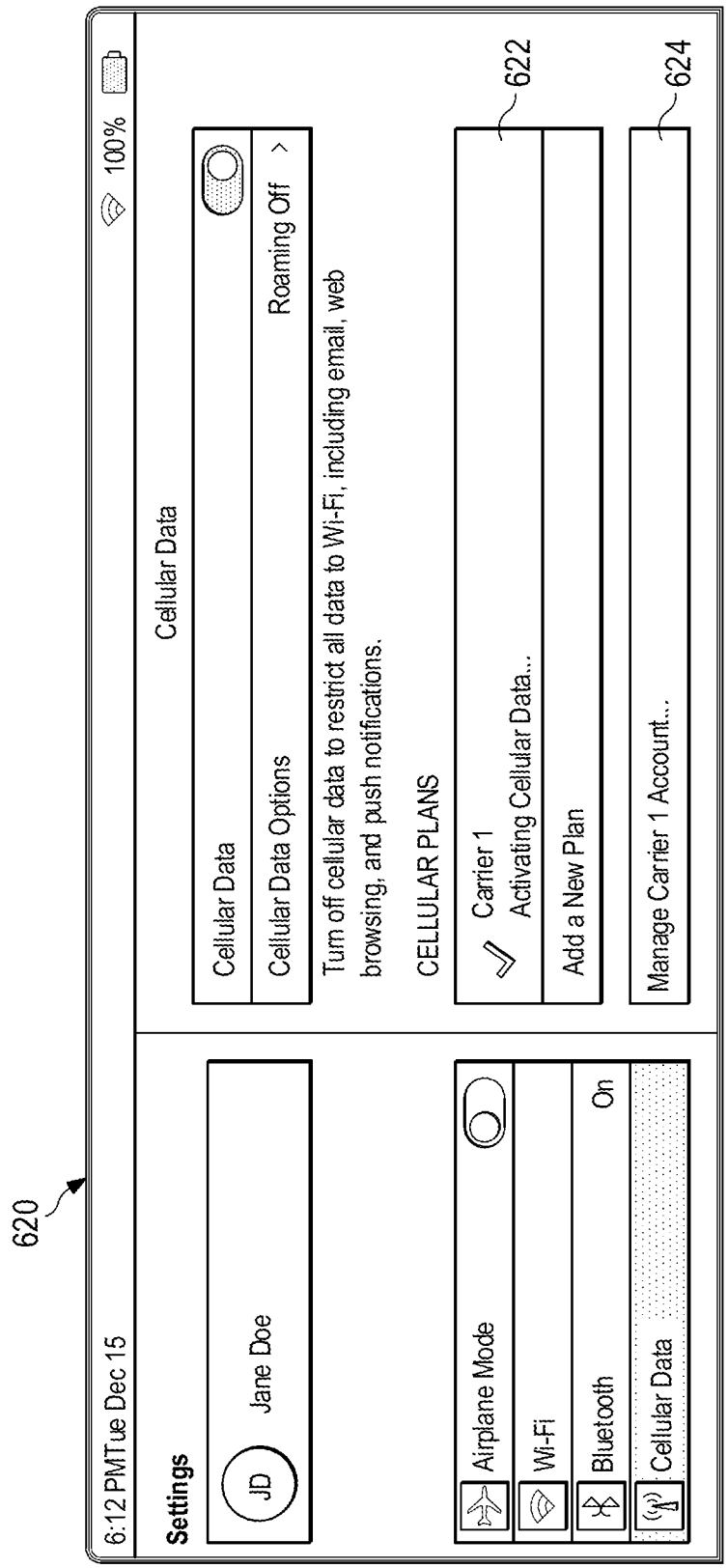

At 214, the secondary wireless device 104 sends a message to the primary wireless device 102 with a request to enroll in an add-on plan with the selected carrier. The primary wireless device 102 communicates with the carrier system 204 at 216 (e.g., through one or more API calls) to obtain information associated with the provider (e.g., websheet information), such as a sign-up URL and post data, for the selected carrier. At 218, the primary wireless device 102 provides the information associated with the provider (e.g., the sign-up URL and post data for the web sheet of the provider) to the secondary wireless device 104. The secondary wireless device 104 then uses this information to display the information associated with the provider (e.g., display a websheet) for the selected carrier to the user, such as shown in FIG. 6B. At 220, the user completes the websheet to enroll the secondary wireless device 104 in an add-on plan for the selected carrier. Completion of the websheet causes, at 222, execution of a callback function (e.g., a javascript (JS) callback function), which triggers activation (e.g., profile/eSIM download and installation) of the secondary wireless device 104 at 224 (e.g., as shown in FIG. 6C). In this example, completion of the websheet also causes the secondary wireless device 104 to enter a monitoring mode at 226 after eSIM installation in which the device communicates with the carrier system 204 to provide account management services, account status updates, and data usage updates.

Figure 3:
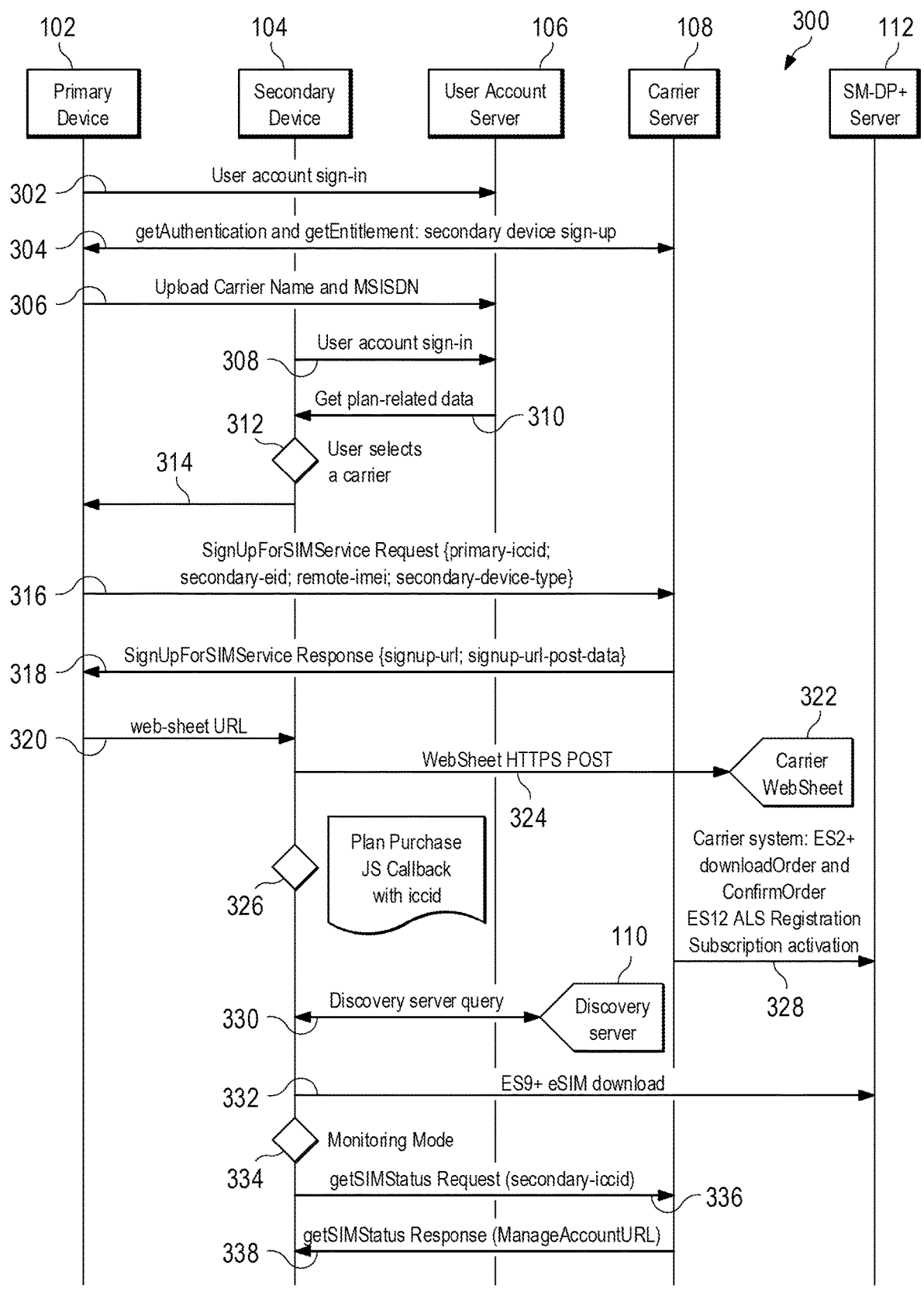
FIG. 3 illustrates an example diagram for non-native on-device enrollment in a cellular add-on plan.

FIG. 3 illustrates a diagram 300 for non-native on-device enrollment in a cellular add-on plan. Initially, at 302, a user signs in to his or her user account on the primary wireless device 102. At 304, the primary wireless device 102 executes a 'getAuthentication' API call and a 'getEntitlement' API call to the carrier server 108. The 'getAuthentication' API call identifies and authenticates the primary wireless device 102 as a subscriber to the network associated with the carrier server 108. The 'getEntitlement' API call checks for support of particular features of the cellular plan associated with the primary wireless device 102, such as whether the secondary wireless device 104 can be added on to the cellular plan. At 306, the primary wireless device 102 uploads plan-related data to the user account server 106, such as the MSISDN for the primary wireless device 102, the carrier name for the cellular plan associated with the primary wireless device 102, and information about particular features of the plan obtained in 304, among other information.

At 308, the user signs in to his or her user account on the secondary wireless device 104, which prompts the secondary wireless device 104 to retrieve the plan-related data associated with the user account from the user account server 106 at 310. The secondary wireless device 104 displays some or all of the retrieved plan-related data to allow the user to select an add-on plan. In this example, the user selects a carrier (e.g., the carrier of the cellular plan for the primary wireless device 102) for add-on plan enrollment at 312.

The selected carrier is passed from the secondary wireless device 104 to the primary wireless device 102 at 314. At 316, the primary wireless device 102 executes a 'SignUpForSIMService' API call to the carrier server 108. In this example, the 'SignUpForSIMService' API call requests information associated with the provider (e.g., websheet information), such as a sign-up URL and post data, for the selected carrier. The request includes the ICCID of the primary wireless device 102, as well as the embedded identity document (EID), international mobile equipment identity (IMEI), and device type for the secondary wireless device 104 to ensure that the carrier server 108 can identify the correct subscriber account and present the right landing page and context to the user. At 318, the carrier server 108 responds to the primary wireless device 102 with the requested websheet information (e.g., the sign-up URL and post data). The primary wireless device 102 provides the websheet information to the secondary wireless device 104 at 320, and the secondary wireless device 104 executes a HTTPS POST using the websheet information to display the carrier websheet 322 at 324.

At 326, the user completes the websheet presented on the secondary wireless device 104 to purchase and enroll the secondary wireless device 104 in the add-on cellular plan. In this example, completion of the web sheet enrollment process triggers a JS callback function, which can include the ICCID of the secondary wireless device 104 as a parameter. At 328, the callback function causes the carrier server 108 (or, more generally, the carrier system 204) to confirm and download the order (e.g., the purchase of the add-on plan) over an ES2+ interface between the carrier server 108 and the SM-DP+ server 112, and initiate the subscription registration and activation process over an ES12 interface between the discovery server 110 and the SM-DP+ server 112. At 330, the secondary wireless device 104 queries the discovery server 110 for the SM-DP+ address for the carrier of the add-on plan. The secondary wireless device 104 then uses this address at 332 to coordinate download and installation of the eSIM profile from the SM-DP+ server 112 (e.g., over an ES9+ interface).

Once activated, the secondary wireless device 104 can operate on the network in accordance with the add-on plan. At 334, the secondary wireless device 104 enters a monitoring mode in which it can issue a 'getSIMStatus' API call to the carrier server 108 at 336. In this example, the 'getSIMStatus' API call requests the status of the cellular add-on plan based on the ICCID of the secondary wireless device 104 that is provided as a parameter. At 338, the carrier server 108 responds to the secondary wireless device 104 with account management information (e.g., account information for the cellular add-on plan, such as data usage for the plan, and/or information to access an account with the provider of the cellular add-on plan, such as a manage account URL and post data). In an example, the secondary wireless device 104 uses the account management information to provide (e.g., natively on the device or in a websheet) account management services, account status updates, and data usage updates, among other information.

Figure 4:
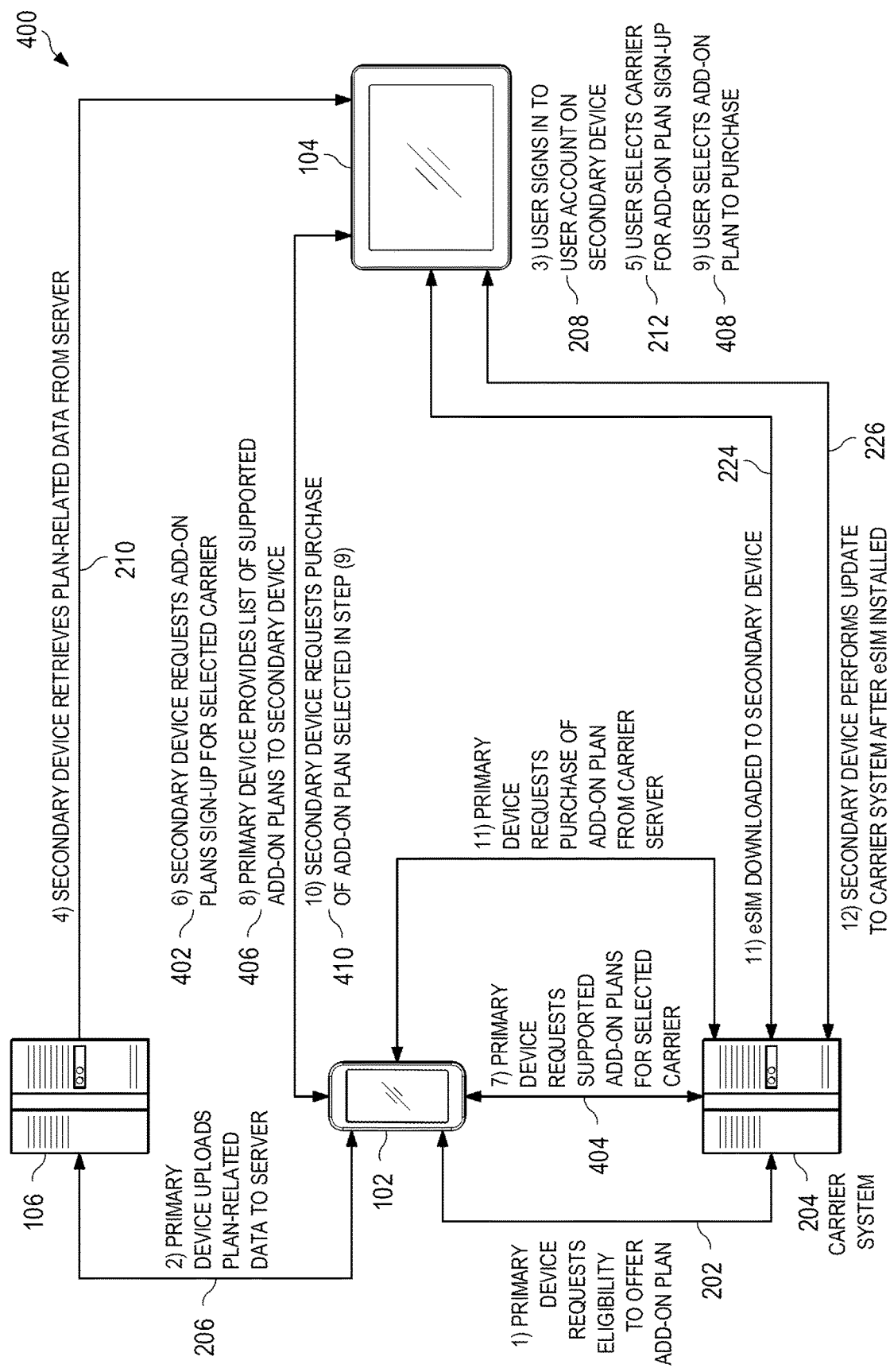
FIG. 4 illustrates an example process for native on-device enrollment in a cellular add-on plan.

FIG. 4 illustrates an example process 400 for native on-device enrollment in a cellular add-on plan. In general, the terms "native on-device enrollment" or "native enrollment" are used to refer to enrollment of a device (e.g., the secondary wireless device 104) in an add-on plan that is carried out within the native or built-in user interface of the operating system executing on the device. In contrast, the terms "non-native enrollment" or "websheet-based enrollment" are used to refer to enrollment of a device in an add-on plan that is carried out by use of information associated with the provider, such as a websheet of the provider, which is loaded on the device and does not necessarily use the device's native user interface. The process 400 for native on-device enrollment is similar to the process 200 for websheet-based on-device enrollment. However, unlike the process 200 in which a websheet for a selected carrier is provided to the secondary wireless device 104 for the user to view and purchase an add-on plan, the process 400 retrieves and presents a list of add-on plans in the native user interface of the secondary wireless device 104 for the user to view and purchase. For the sake of brevity, only the differences between the process 200 and the process 400 are describe below.

Figure 7A:
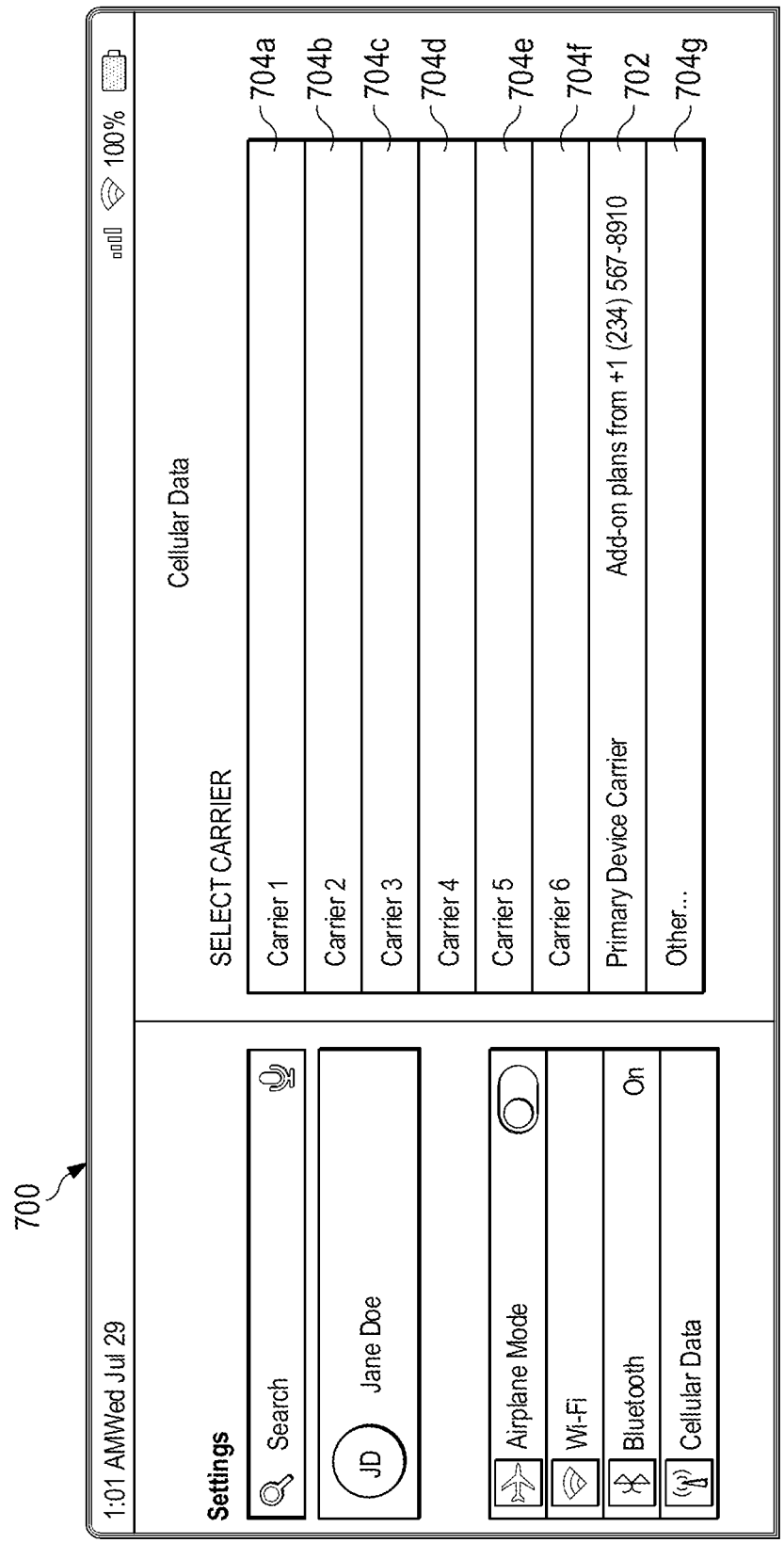
FIGS. 7A-7G illustrate example user interfaces for native on-device enrollment in an add-on plan.
Figure 7B:
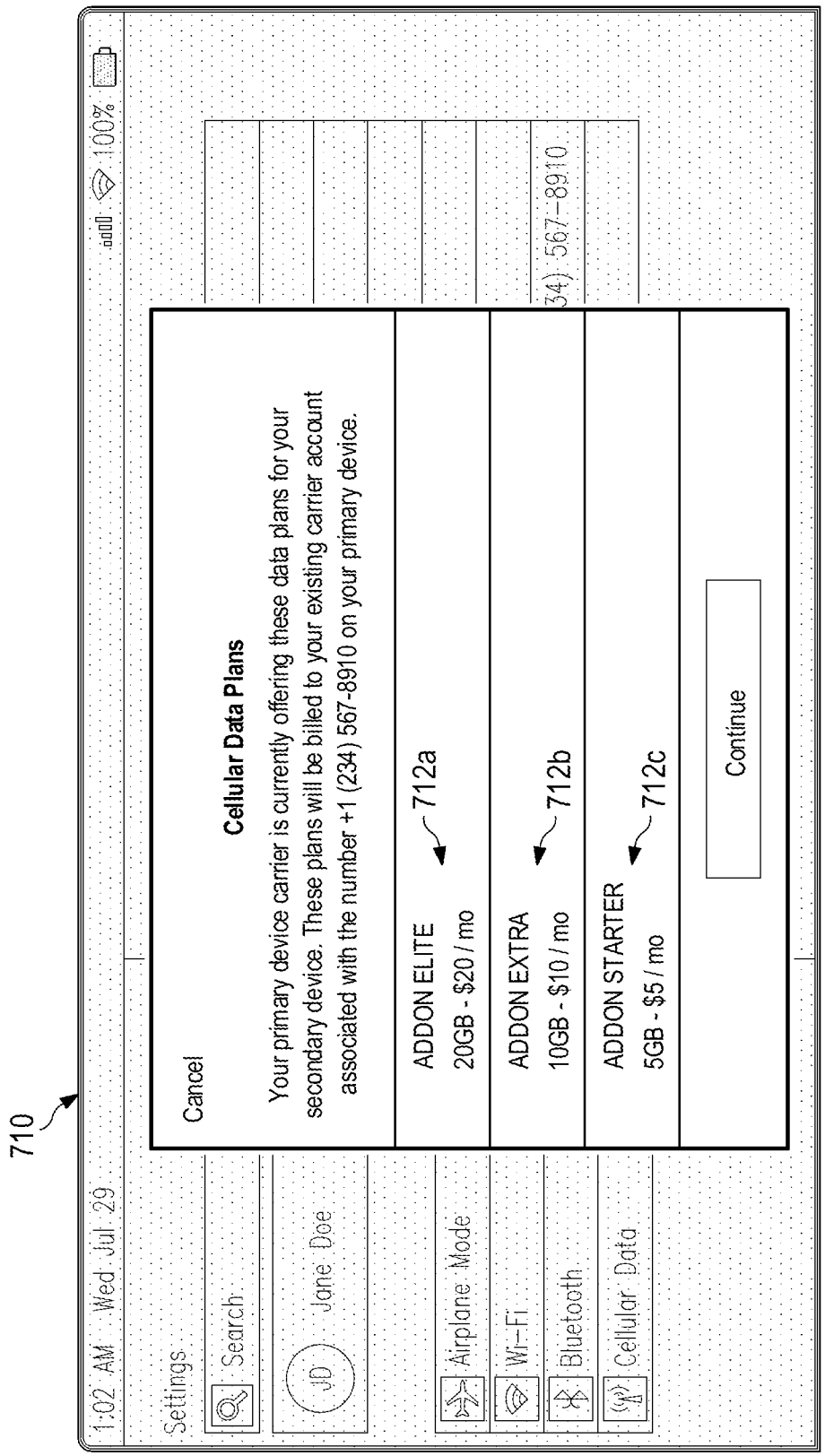

In the process 400, after the user selects a carrier for add-on plan enrollment at 212 (e.g., by selecting the carrier of the cellular plan for the primary wireless device 102, as shown in FIG. 7A), the secondary wireless device 104 transmits a message to the primary wireless device 102 with a request for available add-on plans for the selected carrier at 402. The primary wireless device 102 communicates with the carrier system 204 at 404 (e.g., through one or more API calls) to obtain a list of available add-on plans for the selected carrier. At 406, the primary wireless device 102 provides the list of supported add-on plans to the secondary wireless device 104. The secondary wireless device 104 displays the list of add-on plans to the user in a native user interface, such as shown in FIG. 7B.

Figure 7C:
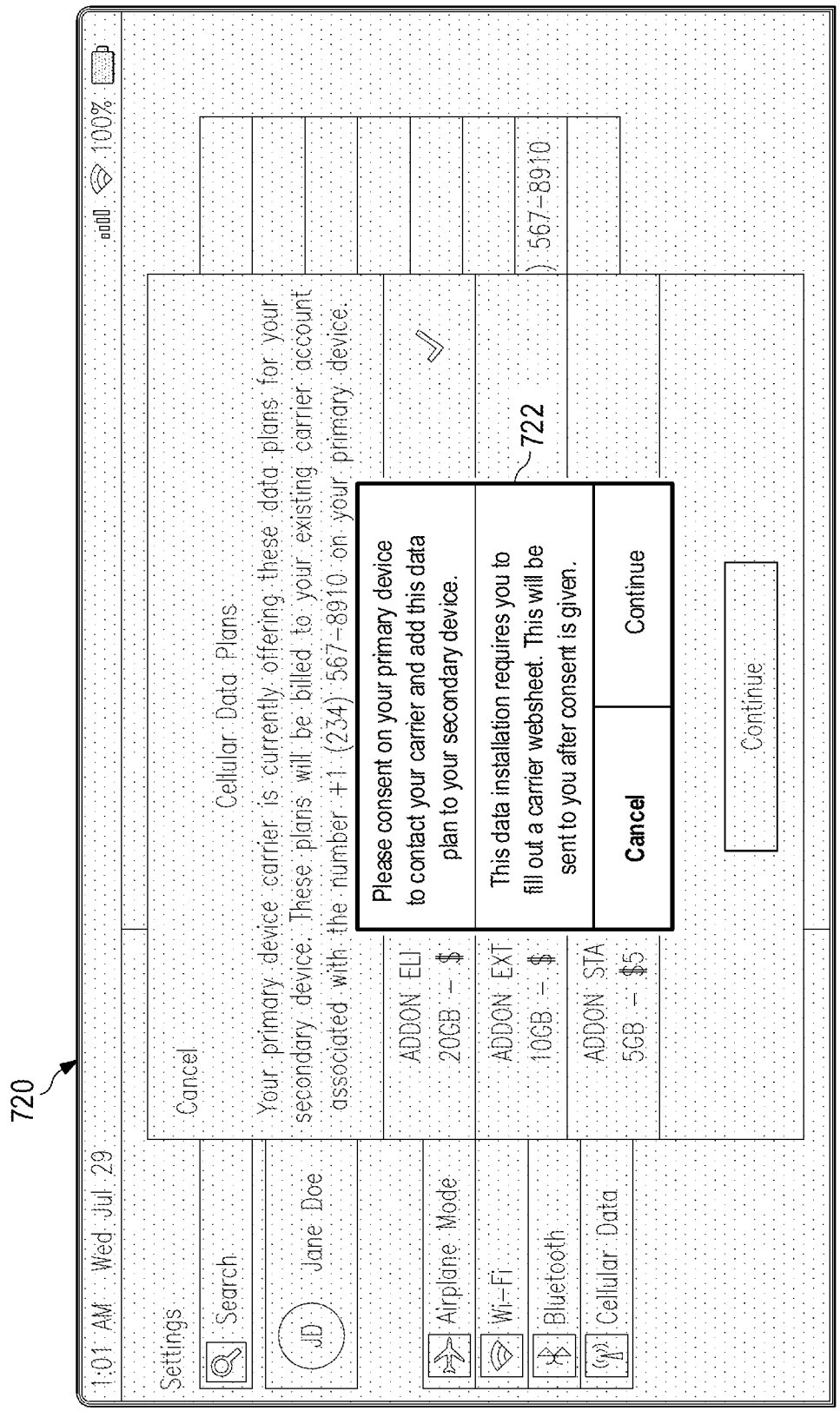
Figure 7D:
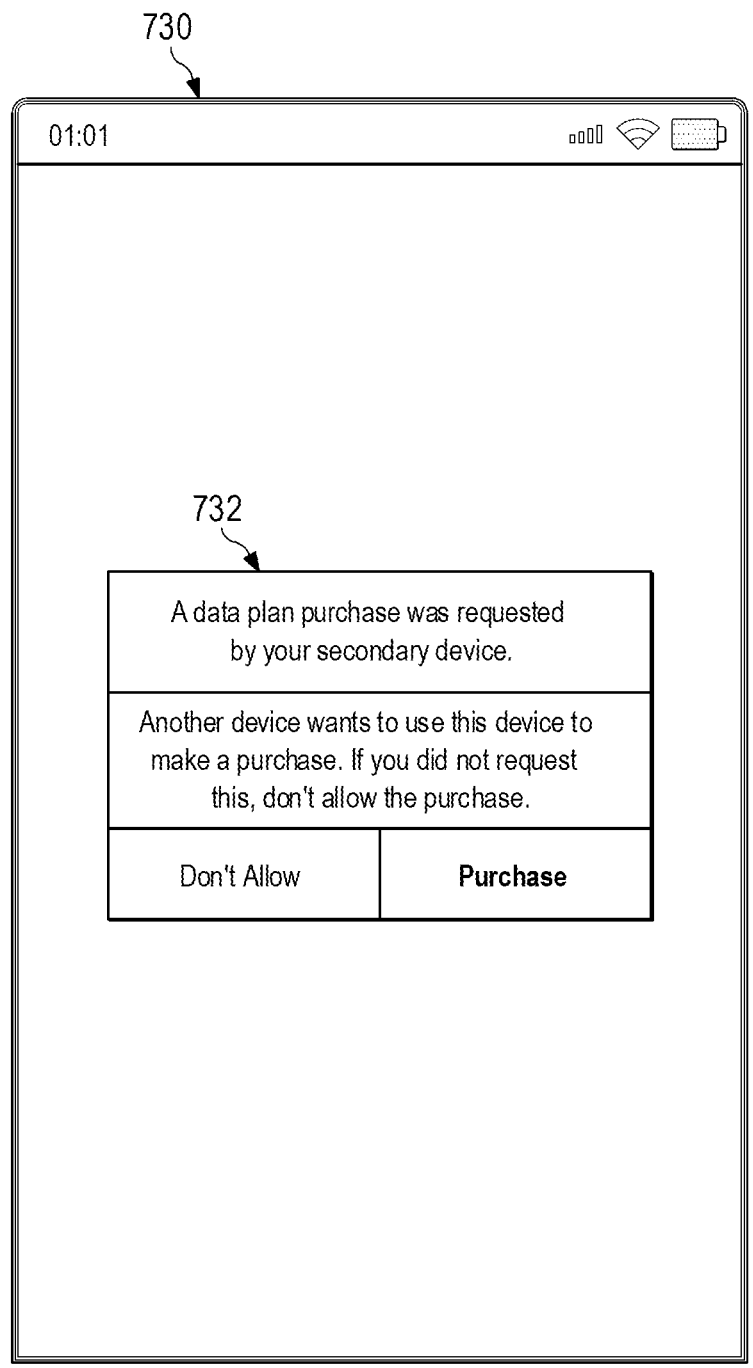
Figure 7E:
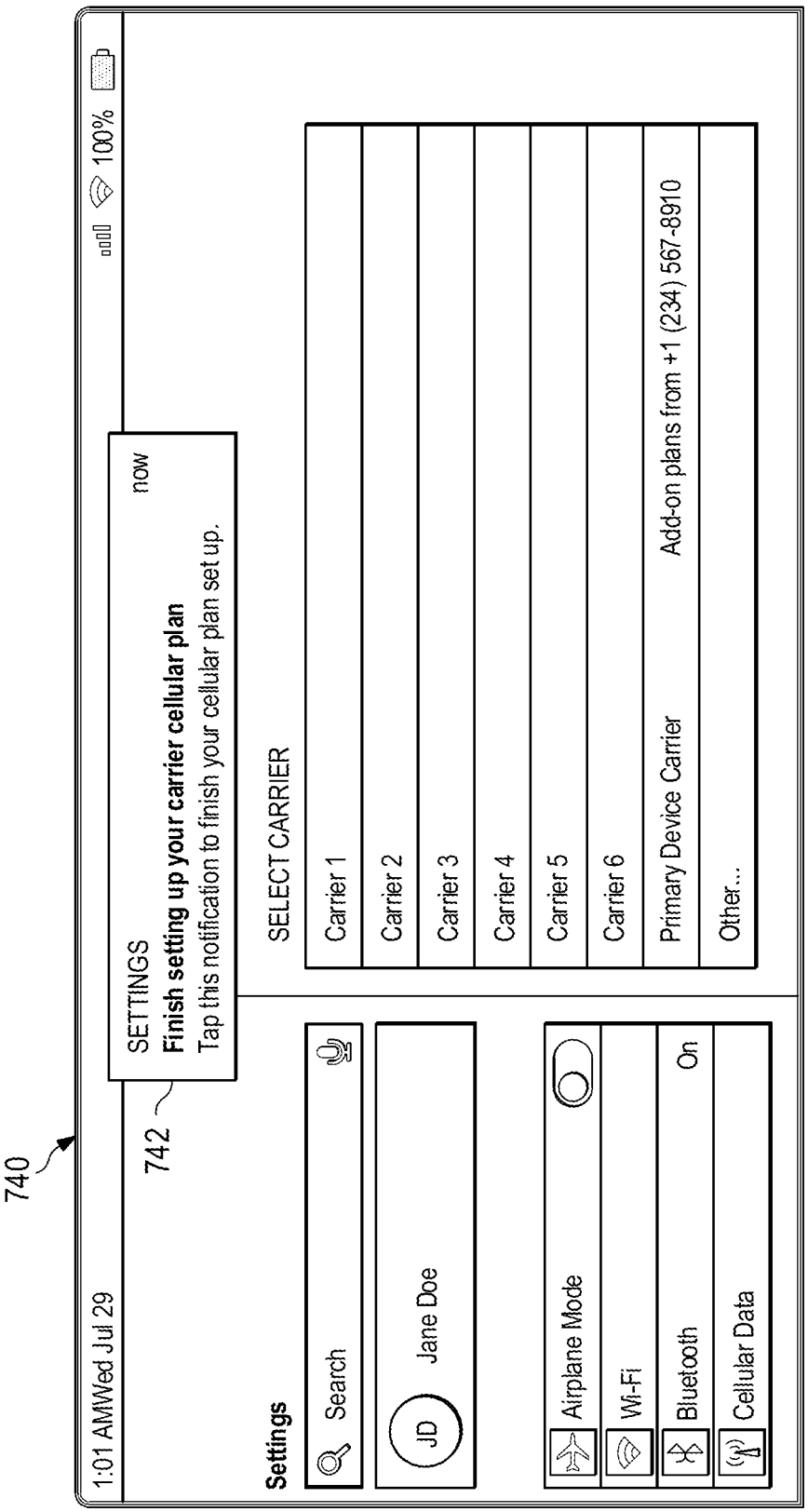
Figure 7F:
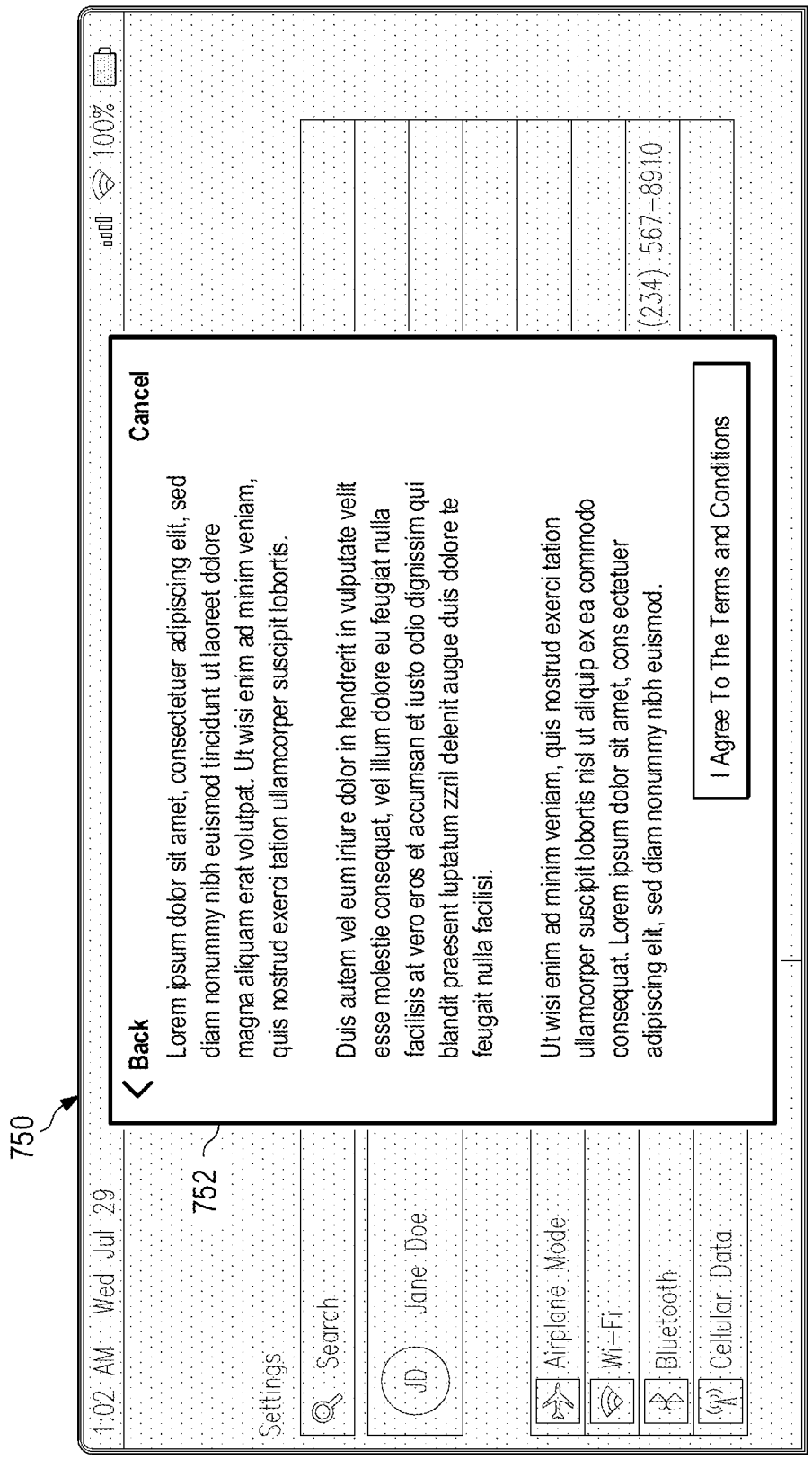

At 408, the user selects an add-on plan to enroll in (e.g., purchase) for the secondary wireless device 104. In response, the secondary wireless device 104 transmits a message to the primary wireless device 102 at 410 with a request to enroll the secondary wireless device 104 in the selected add-on plan. At 412, the primary wireless device 102 communicates with the carrier system 204 (e.g., through one or more API calls) to enroll the secondary wireless device 104 in the add-on plan. In this manner, the process 400 effectively implements a "one-click" enrollment process since the user of the secondary wireless device 104 need only select an add-on plan to enroll in and the remainder of the enrollment process (including eSIM download and installation) is carried about the by primary wireless device 102 and the carried system 204. To increase security, the user of the secondary wireless device 104 can optionally be prompted to consent to the purchase of the selected add-on plan on the primary wireless device 102, as shown in FIGS. 7C and 7D. In an example, the user of the secondary wireless device 104 is prompted to complete the enrollment process by reviewing and agreeing to terms and conditions (e.g., based on carrier requirements), as shown in FIGS. 7E and 7F.

Figure 5:
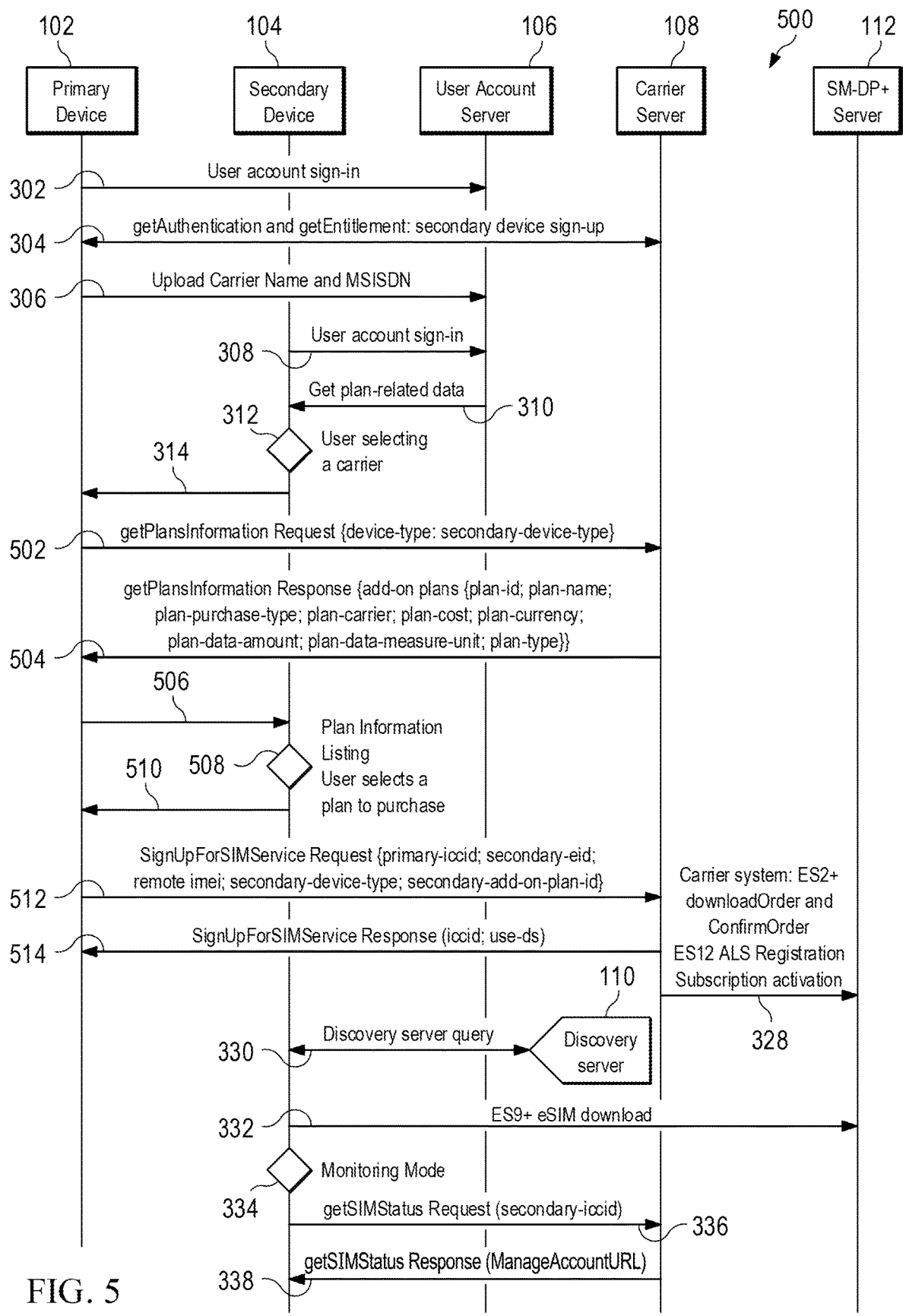
FIG. 5 illustrates an example diagram for native on-device enrollment in a cellular add-on plan.

FIG. 5 illustrates a diagram 500 for native on-device enrollment in a cellular add-on plan. The diagram 500 for native on-device enrollment is similar to the diagram 500 for non-native on-device enrollment, and so, for the sake of brevity, only the differences between the diagram 300 and the diagram 500 are describe below.

After receiving the selected carrier from the secondary wireless device 104 at 314, the primary wireless device 102 executes a 'getPlansInformation' API call to the carrier server 108 at 502. In this example, the 'getPlansInformation' API call requests a list of available add-on plans for the secondary wireless device 104. To ensure privacy, no device identifiers are shared at this point, and instead only the device type for the secondary wireless device 104 is passed as a parameter of the request. At 504, the carrier server 108 responds to the request with a list of available add-on plans for the specified device type. In an example, the response includes, for each add-on plan in the list of add-on plans, a plan ID, plan name, plan purchase type, plan carrier, plan cost, plan currency, plan data amount, plan data measure unit, or plan type, or combinations of them, among other information. In an example, the 'getPlansInformation' API call is backed by authentication of the requesting device (e.g., the primary wireless device 102), such as by the carrier server 108 challenging the eSIM (or SIM) of the primary wireless device 102, at which point the device sends a response to the carrier server 108 to authenticate itself At 506, the list of available add-on plans is provided to the secondary wireless device 104 for display. The user selects an add-on plan to purchase for the secondary wireless device 104 at 508, and the selected add-on plan is passed to the primary wireless device 102 at 510. At 512, the primary wireless device 102 executes a 'SignUpForSIMService' API call to the carrier server 108. Unlike the non-native (e.g., websheet-based) 'SignUpForSIMService' API call discussed with reference to FIG. 3 which returns websheet information for completing enrollment, the native 'SignUpForSIMService' API call executed at 512 triggers the enrollment of the secondary wireless device 104 in the selected add-on plan and returns the ICCID for the secondary wireless device 104. The request (e.g., API call) includes an add-on plan identifier for the selected add-on plan, as well as the ICCID of the primary wireless device 102 and the EID, IMEI, and device type for the secondary wireless device 104. The carrier server 108 can determine whether the 'SignUpForSIMService' API call is for a non-native enrollment or a native enrollment based on, for example, one or more parameters of the request (e.g., one or more parameters expressly identifying the type of the request), or the presence or absence of one or more parameters of the request (e.g., if the request identifies an add-on plan identifier, the carrier server 108 can determine that it is a native enrollment request), among others. In an example, this API call is triggered only after user consent (e.g., as shown in FIGS. 7C and 7D).

In an example, one or more rules or filters can be applied to determine add-on plan eligibility for the secondary wireless device 104 or to determine which add-on plans to present to a user of the device, or both. Such rules or filters can be applied by, for example, the primary wireless device 102, the secondary wireless device 104, the user account server 106, the carrier server 108, or combinations of them, among other components of the systems described herein. In an example, one or more rules, such as business rules, are applied to determine whether the secondary wireless device 104 is eligible for enrollment as an add-on to the cellular plan of the primary wireless device 102 (e.g., such as by the carrier server 108 in response to the 'getEntitlement' API call or the discovery server 110 in response to the 'GetAddOnOptions' API call described with reference to FIG. 9). For example, if the primary wireless device 102 and/or the secondary wireless device 104 is activation locked to a particular carrier, then one or more business rules can be applied to restrict enrollment of the secondary wireless device 104 to cellular plans of the particular carrier (e.g., by preventing enrollment of the secondary wireless device 104 in a cellular plan of another carrier).

In an example, one or more rules or filters can be applied to plan-related data uploaded to the user account server 106 to detect transferred or inactive plans on the primary wireless device 102 in order to suppress add-on offers for those plans. In an example, one or more rules or filters can be applied to suppress plan offerings if the same carrier plan is already present on the secondary wireless device 104. In an example, such as where the primary wireless device 102 includes multiple plans or there are multiple potential primary wireless devices, one or more rules or filters can be applied to reduce the number of plans presented to a user and facilitate user decision making. For example, one or more rules or filters can be applied (e.g., to the plan-related data) to identify and present only add-on plans for the active plan (e.g., the active plan selected on the primary wireless device 102 when the device is in a dual SIM configuration) for the freshest primary wireless device 102 (e.g., the device with the maximum value of max(cellular plan upload time, last AuthKit heartbeat)). As another example, one or more rules or filters can be applied to present only add-on plans for enabled plans on the freshest primary wireless device 102 (e.g., do not show disabled plans). As another example, one or more rules or filters can be applied to present only add-on plans for any plan on the freshest primary wireless device 102. As another example, one or more rules or filters can be applied to present only add-on plans for active plans on any primary wireless device 102 (e.g., without regard to freshness of the device). Lastly, in an example, add-on plans can be presented for all plans on all primary wireless devices 102 (although this may result in a long list of add-on plans in some cases).

FIGS. 6 through 8 illustrate various user interfaces for the processes described with reference to FIGS. 1-5. In particular, FIGS. 6A-6C illustrate user interfaces for non-native on-device enrollment in an add-on plan. In FIG. 6A, a user interface 600 includes an option 602 to add the secondary wireless device 104 to the cellular plan of the primary wireless device 102, as well as options 604a-604f to enroll the secondary wireless device 104 in a cellular plan with a particular carrier (e.g., by adding the device to an existing plan with the carrier, creating a new plan with the carrier, etc.). FIG. 6B illustrates a user interface 610 with a websheet 612 for a selected carrier (e.g., 'Carrier 1') for completing enrollment of the secondary wireless device 104. FIG. 6C illustrates a user interface 620 showing activation 622 of the secondary wireless device 104 with the selected carrier, as well as an option 624 to manage the account associated with the add-on plan.

Figure 7G:
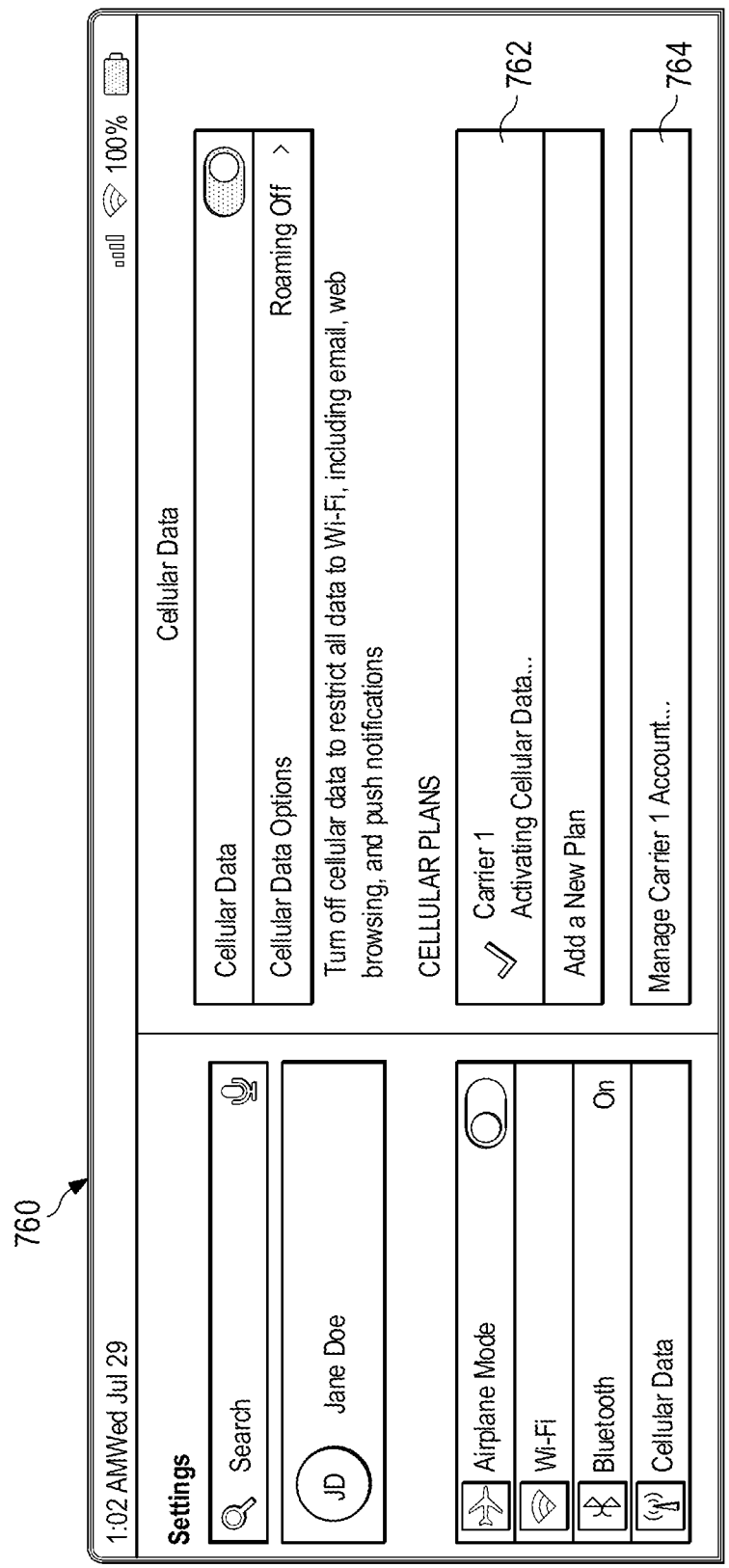

FIGS. 7A-7G illustrate user interfaces for native on-device enrollment in an add-on plan. In FIG. 7A, a user interface 700 includes an option 702 to add the secondary wireless device 104 to the cellular plan of the primary wireless device 102, as well as options 704a-704g to enroll the secondary wireless device 104 in a cellular plan with a particular carrier. FIG. 7B illustrates a user interface 710 listing available add-on plans 712a-712c for the selected carrier. FIG. 7C illustrates a user interface 720 displayed on the secondary wireless device 104 with a prompt 722 requesting that the user consent to adding the secondary wireless device 104 to the cellular plan on the primary wireless device 102, and FIG. 7D illustrates a corresponding user interface 730 displayed on the primary wireless device 102 with a prompt 732 for providing the requested consent. FIG. 7E illustrates a user interface 740 with a prompt 742 for the user of the secondary wireless device 104 to complete enrollment in the add-on plan, for example, by reviewing and agreeing to the terms and conditions 752 shown in the user interface 750 in FIG. 7F. FIG. 7G illustrates a user interface 760 showing activation 762 of the secondary wireless device 104 with the selected carrier, as well as an option 764 to manage the account associated with the add-on plan.

Figure 8A:
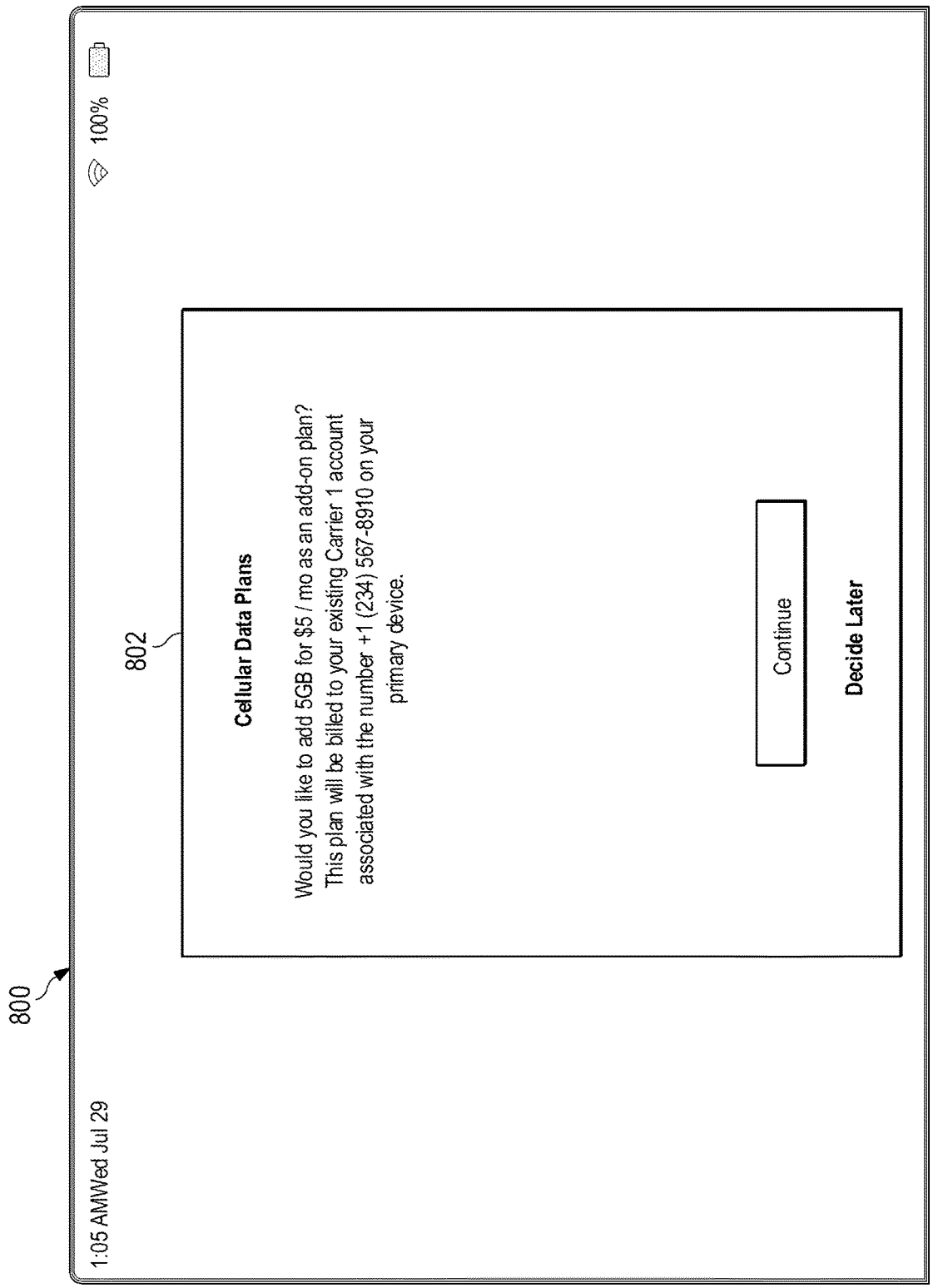
FIGS. 8A-8E illustrate example user interfaces for native on-device enrollment in an add-on plan during initial setup of the secondary wireless device.
Figure 8B:
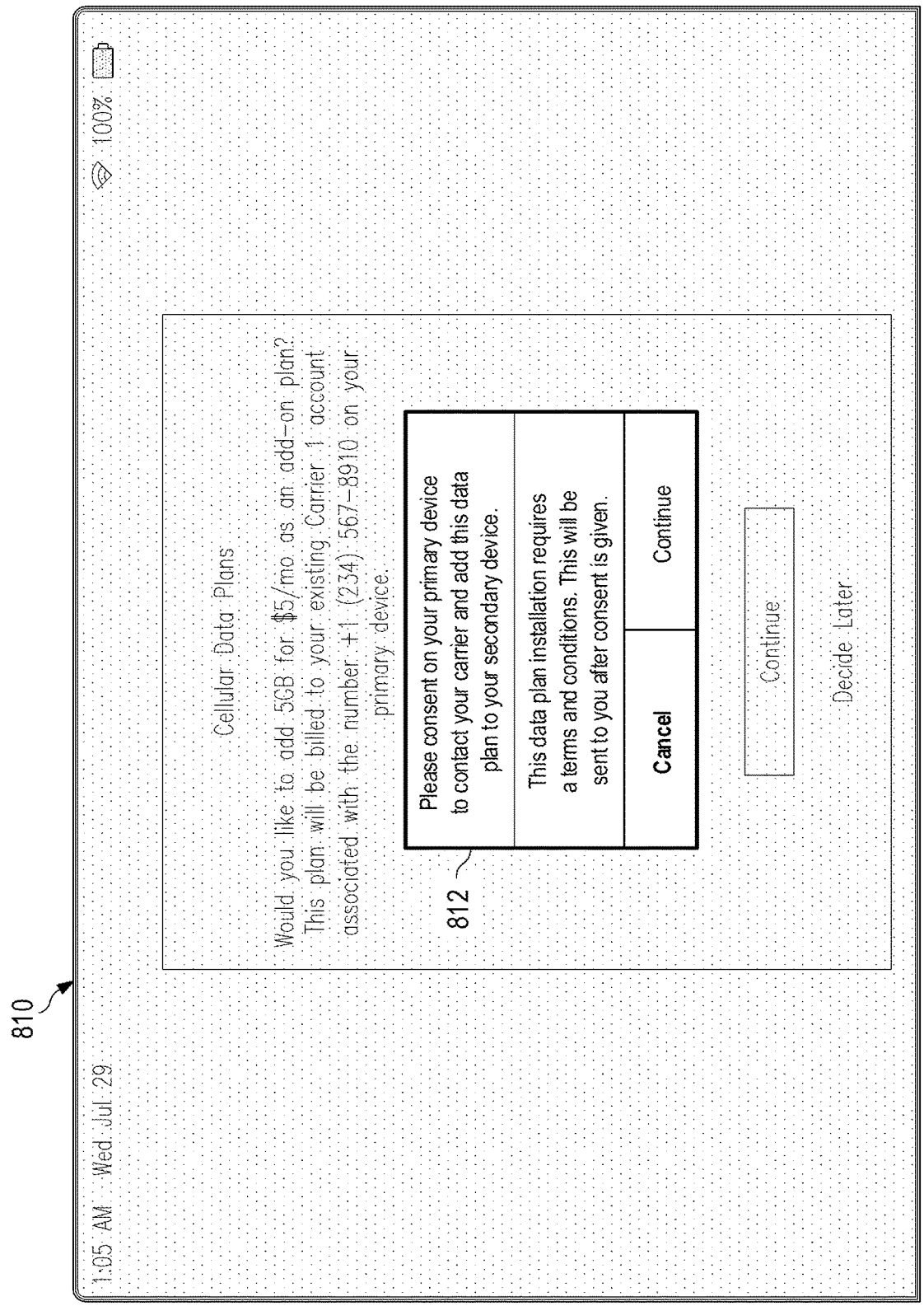
Figure 8C:
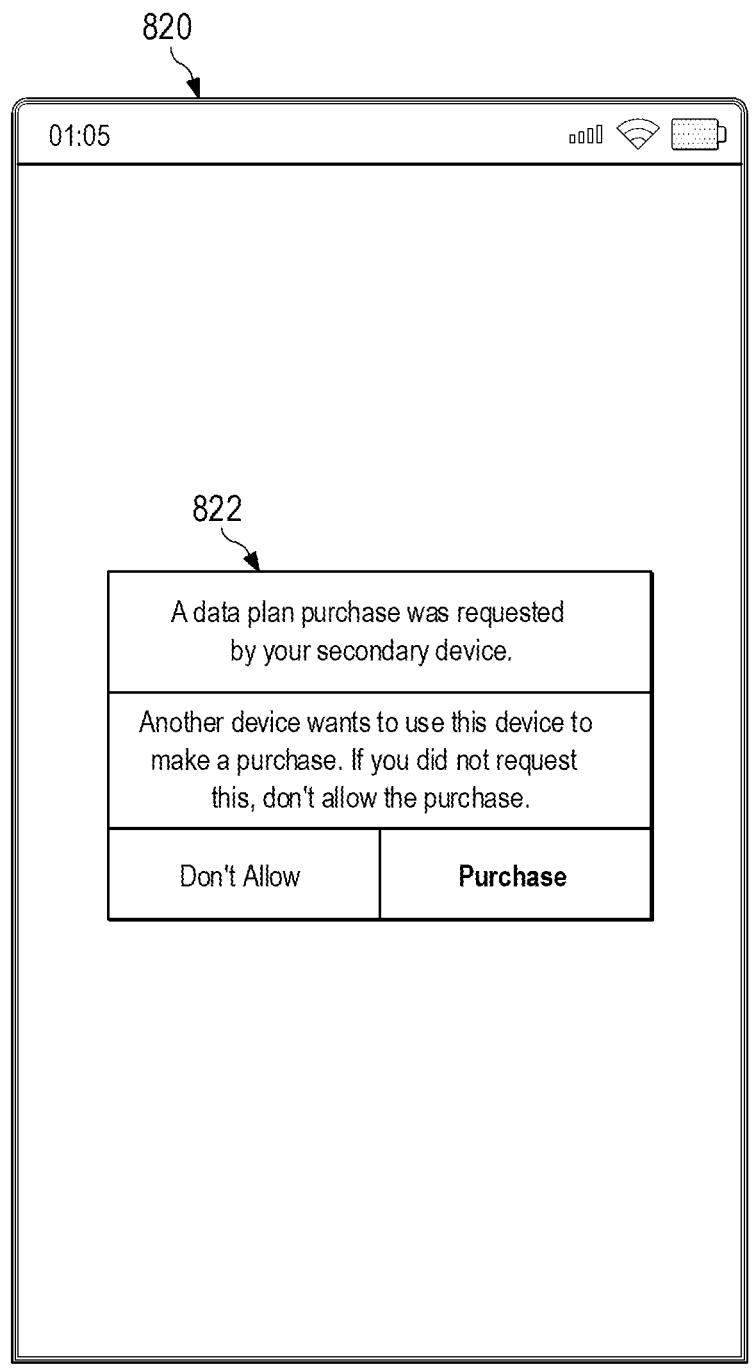
Figure 8D:
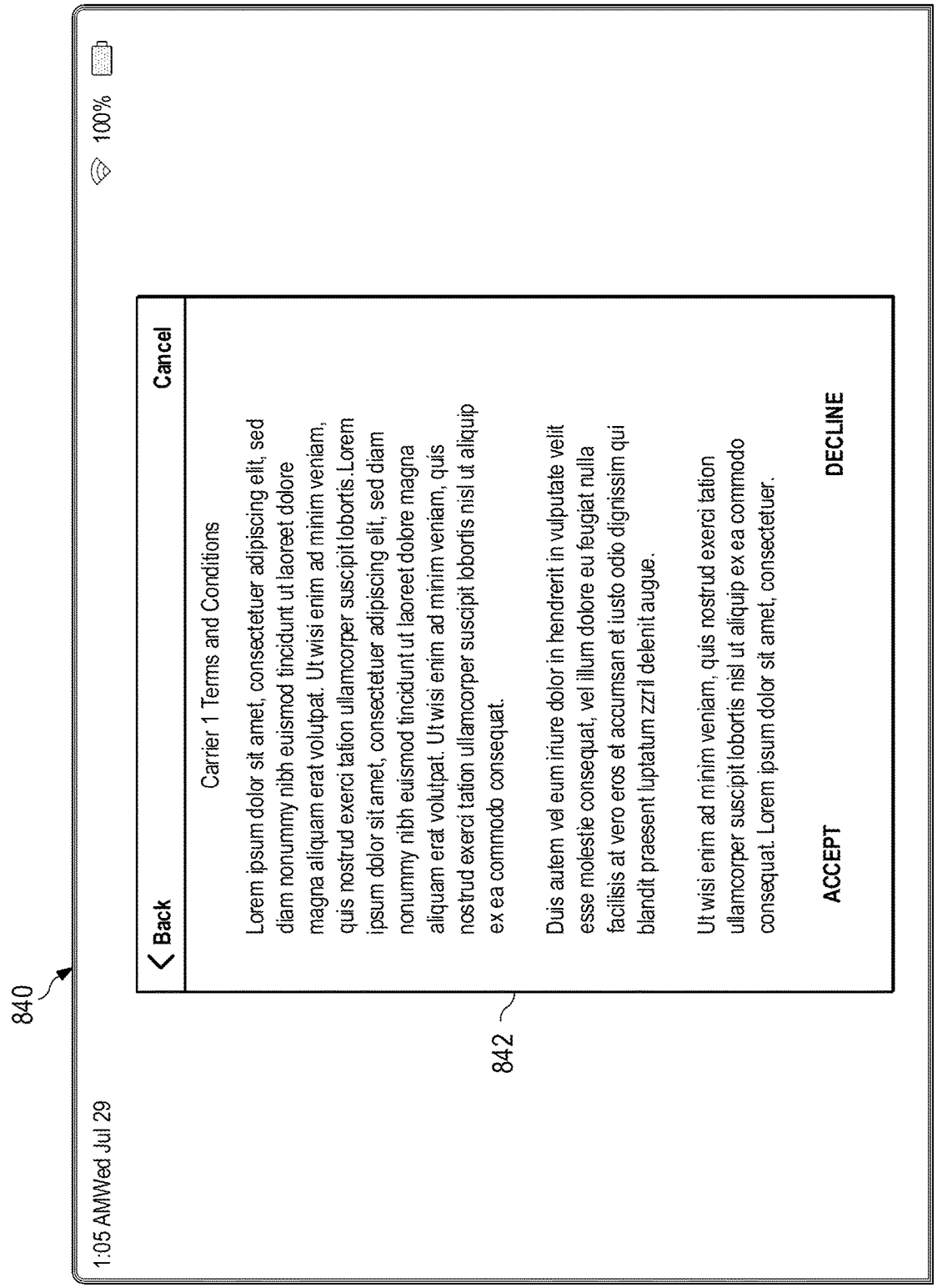
Figure 8E:
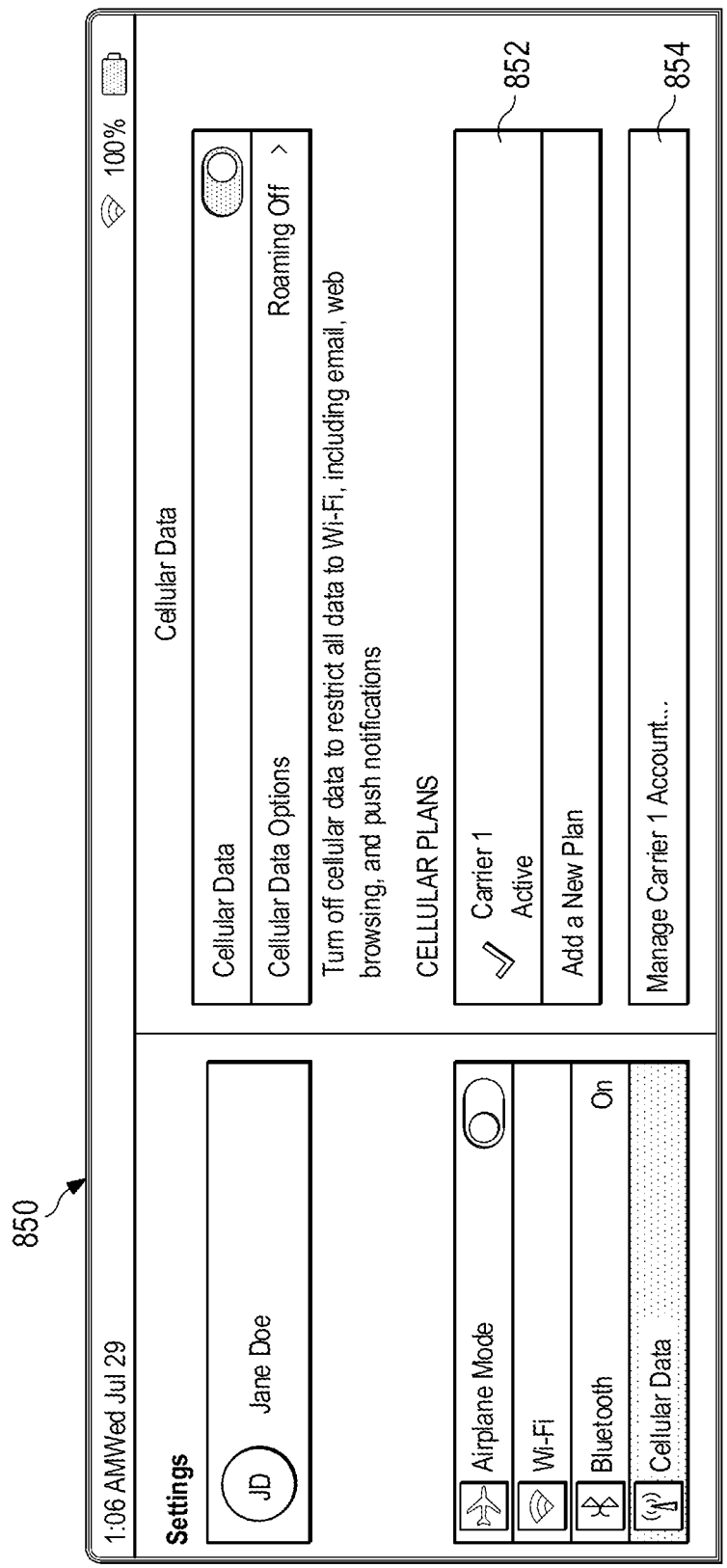

FIGS. 8A-8E illustrate user interfaces for native on-device enrollment in an add-on plan during initial setup of the secondary wireless device 104. In an example, only native on-device enrollment (e.g., non-websheet-based enrollment) is available during setup of the secondary wireless device 104 in order to, for example, avoid a potentially negative user experience with a websheet that detracts from or otherwise interferes with the initial setup process intended by the manufacturer of the secondary wireless device 104. In FIG. 8A, a user interface 800 includes a prompt 802 for the user to add the secondary wireless device 104 to the cellular plan of the primary wireless device 102. FIG. 8B illustrates a user interface 810 displayed on the secondary wireless device 104 with a prompt 812 requesting that the user consent to adding the secondary wireless device 104 to the cellular plan on the primary wireless device 102, and FIG. 8C illustrates a corresponding user interface 820 displayed on the primary wireless device 102 with a prompt 822 for providing the requested consent. FIG. 8D illustrates a user interface 840 with a prompt 842 showing the terms and conditions for the carrier of the selected plan (e.g., 'Carrier 1') for the user to review and accept or decline. FIG. 8E illustrates a user interface 850 showing that the secondary wireless device 104 has been activated 852 with the selected carrier, as well as an option 854 to manage the account associated with the add-on plan.

Figure 9:
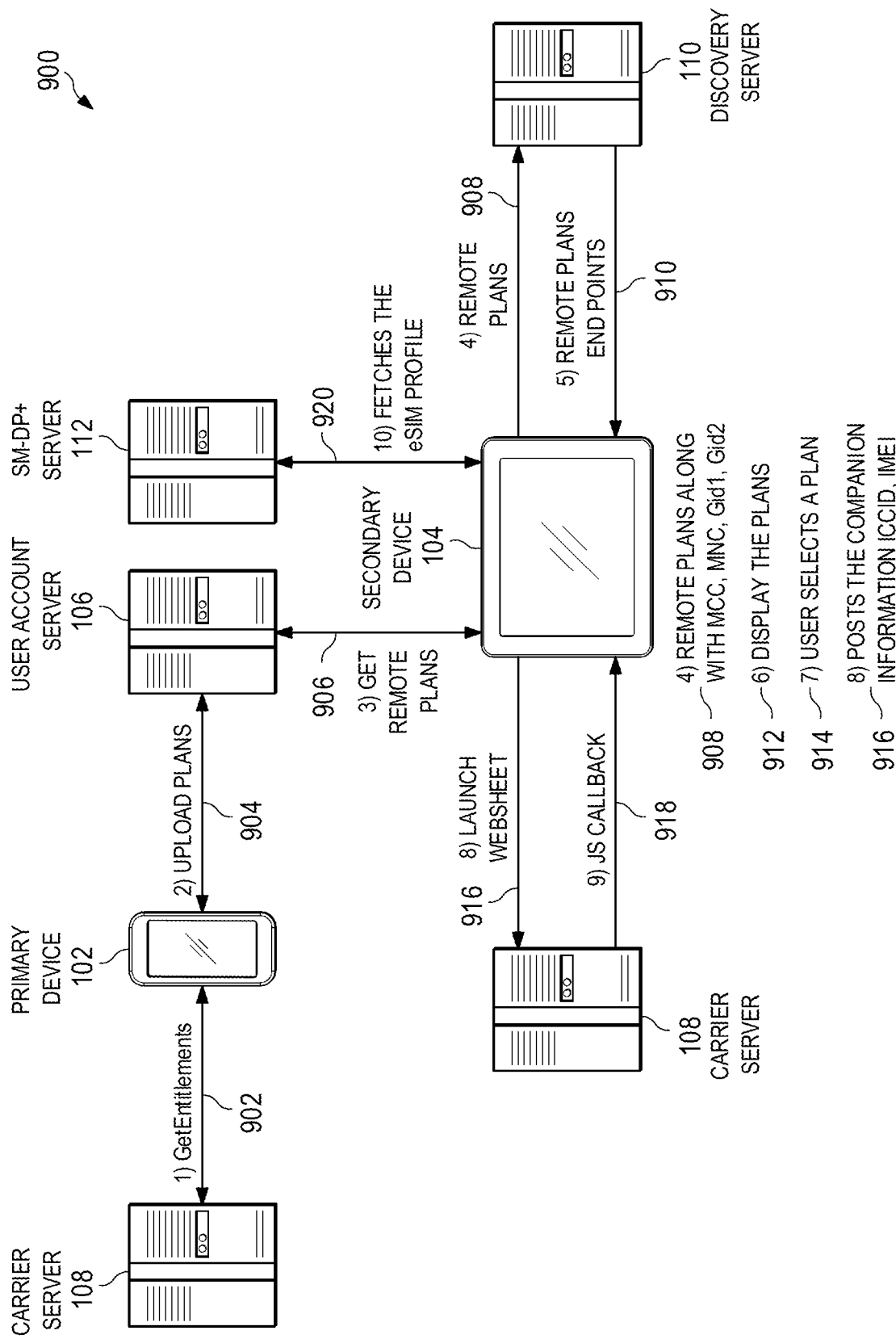
FIG. 9 illustrates an example system for on-device enrollment in a cellular add-on plan.

FIG. 9 illustrates an example of a system 900 for on-device enrollment in a cellular add-on plan. Much like the system 100, the system 900 includes a primary wireless device 102, a secondary wireless device 104, a user account server 106, a carrier server 108, a discovery server 110, and a SM-DP+ server 112. However, in the system 900, the secondary wireless device 104 communicates with the carrier server 108 and discovery server 110 to discover available add-on plans and facilitate enrollment.

Initially, at 902, the primary wireless device 102 communicates with the carrier server 108 (e.g., through a 'getEntitlement' API call) to determine whether the cellular plan associated with the primary wireless device 102 is eligible to offer an add-on plan to the secondary wireless device 104. At 904, plan-related data for the primary wireless device 102, including the eligibility information obtained in 902, is uploaded by the primary wireless device 102 to the user account server 106. The secondary wireless device 104 retrieves the plan-related data from the user account server 106 at 906.

At 908, the secondary wireless device 104 communicates with the discovery server 110 to determine whether the discovery server 110 has any websheet information (e.g., URL end points and/or post data) for enrolling in an add-on plan with one or more of the carriers included in the plan-related data. In an example, the secondary wireless device 104 discovers the sign-up URL end points by generating a 'GetAddOnOptions' API call to the discovery server 110 with a list of possible carriers and/or other plan-related data (e.g., mobile country code (MCC), mobile network code (MNC), group identifier (GID1/GID2), ICCID, etc.). In response, the discovery server 110 provides a list of URL end points, post data, and/or other websheet information to the secondary wireless device 104 at 910. In an example, the discovery server 110 applies one or more rules, such as business rules, to determine whether to provide a particular URL end point to the secondary wireless device 104. For example, if the discovery server 110 determines that a particular carrier plan is incompatible with the secondary wireless device 104 (e.g., because the device is locked to another carrier), the discovery server 110 can withhold the URL end point associated with the particular carrier plan (or can provide an indication that the carrier plan is incompatible with the secondary device).

At 912, the secondary wireless device 104 displays the available add-on plans received from the discovery server 110. The user selects a plan at 914, and the secondary wireless device 104 executes a HTTPS POST at 916 to launch the websheet corresponding to the selected plan. In an example, the websheet post includes one or more remote plan identifiers, such as the ICCID, IMEI, and/or MSISDN (phone number) of the primary wireless device 102 or the secondary wireless device 104, or both, to allow the carrier server 108 to provide the correct context or landing page on the websheet for the add-on plan. In an example, the carrier server 108 uses the post information to bypass user login into the websheet, or to provide a curated add-on plan. In an example, the websheet post includes a handoff token to allow the carrier server 108 to retrieve an EID for the secondary wireless device 104 from the discovery server 110 after enrollment and carry out eSIM provisioning. After the user completes enrollment of the secondary wireless device 104 in the selected add-on plan using the websheet, a JS callback function is executed at 918 to trigger activation of the secondary wireless device 104 on the carrier network, including download and installation of the eSIM profile on the secondary wireless device 104 at 920.

Figure 10:
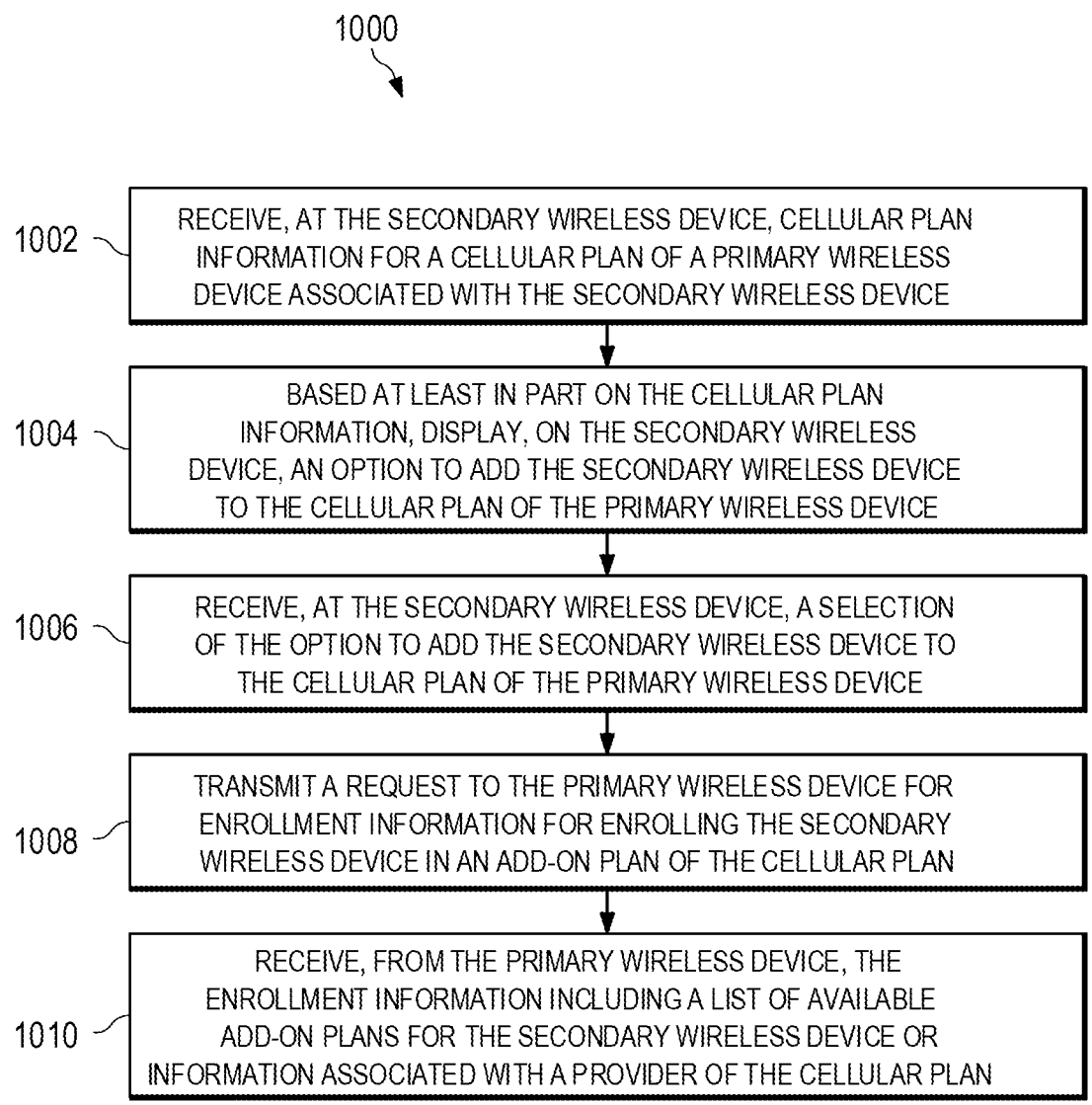
FIGS. 10-12 illustrate example processes for on-device enrollment in a cellular add-on plan.

FIG. 10 illustrates a flowchart of an example process 1000 for on-device enrollment in a cellular add-on plan. In some examples, the electronic device(s), system(s), or component(s), or portions or implementations thereof, of FIGS. 1-9 are configured to perform the process 1000.

Operations of the process 1000 include receiving, at the secondary wireless device, cellular plan information for a cellular plan of a primary wireless device associated with the secondary wireless device (1002). The cellular plan information can include a carrier of the cellular plan or a phone number of the primary wireless device. In some examples, the cellular plan information includes eligibility information indicating whether the secondary wireless device is eligible to be added to the cellular plan of the primary wireless device. In some examples, the primary wireless device is associated with the secondary wireless device based on a shared user account. For example, the process can include receiving, at the secondary wireless device, user account information for a user account that is shared by the primary wireless device and the secondary wireless device, and retrieving the cellular plan information from a server using the user account information.

Based at least in part on the cellular plan information, the secondary wireless device displays an option to add the secondary wireless device to the cellular plan of the primary wireless device (1004). At 1006, the secondary wireless device receives a selection of the option to add the secondary wireless device to the cellular plan of the primary wireless device. The secondary wireless device transmits a request to the primary wireless device for enrollment information for enrolling the secondary wireless device in an add-on plan of the cellular plan (1008). In some examples, the primary wireless device is configured to execute one or more API calls to a carrier server (e.g., the carrier server 108) to retrieve the enrollment information in response to the request.

In response, the secondary wireless device receives the enrollment information from the primary wireless device (1010). The enrollment information can include a list of available add-on plans for the secondary wireless device or a websheet for a provider of the cellular plan. In some examples, operations of the process 1000 include displaying, on the secondary wireless device, the websheet for the provider of the cellular plan and, in response to completion of the websheet (e.g., by a user), executing a callback function to trigger installation of an eSIM profile on the secondary wireless device. In some examples, the process includes displaying, on the secondary wireless device, the list of available add-on plans, receiving, at the secondary wireless device, a selection of an add-on plan from the list of available add-on plans, and transmitting a request to the primary wireless device to enroll the secondary wireless device in the selected add-on plan. In response to receiving the selection of the add-on, the secondary wireless device can display a prompt to the user to consent to enrollment of the secondary wireless device in the selected add-on plan on the primary wireless device. In some examples, an eSIM profile is downloaded and installed on the secondary wireless device in response to enrollment of the secondary wireless device in the selected add-on plan.

Figure 11:
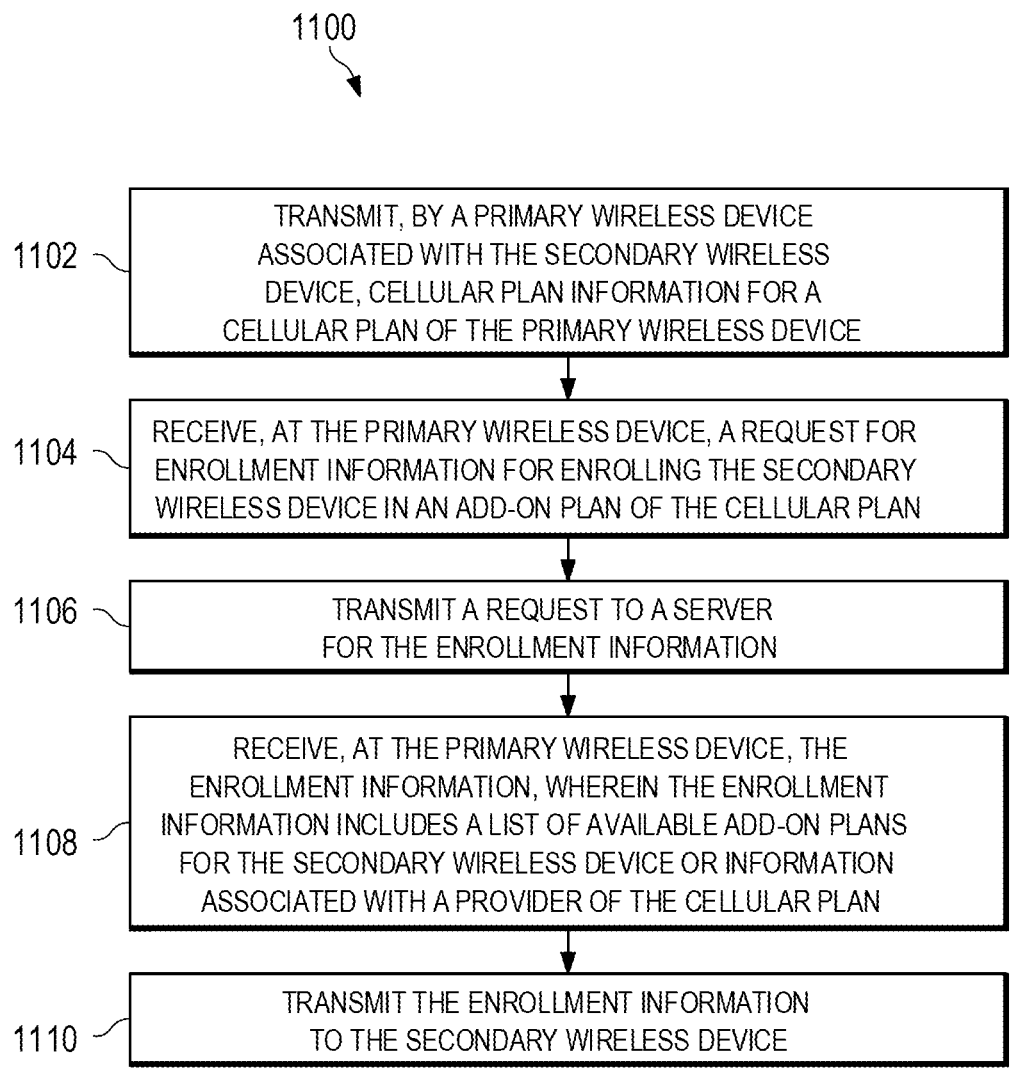

FIG. 11 illustrates a flowchart of another example process 1100 for on-device enrollment in a cellular add-on plan. In some examples, the electronic device(s), system(s), or component(s), or portions or implementations thereof, of FIGS. 1-9 are configured to perform the process 1100.

Operations of the process 1100 include transmitting, by a primary wireless device associated with the secondary wireless device, cellular plan information for a cellular plan of the primary wireless device (1102). For example, the primary wireless device can receive user account information for a user account that is shared by the primary wireless device and the secondary wireless device and transmit the cellular plan information to a server (e.g., the user account server 106). The secondary wireless device can then retrieve the cellular plan information from the server based at least in part on the user account information. In some examples, the cellular plan information includes a carrier of the cellular plan or a phone number of the primary wireless device. In some examples, the primary wireless device executes one or more API calls to a carrier server obtain eligibility information indicating that the secondary wireless device is eligible to be added to the cellular plan of the primary wireless device. The eligibility information can then be included in the cellular plan information transmitted to the server The primary wireless device receives a request for enrollment information for enrolling the secondary wireless device in an add-on plan of the cellular plan (1104). In response, the primary wireless device transmits a request to a server (e.g., the carrier server 108) for the enrollment information (1106). For example, the primary wireless device can execute an API call to the carrier server to obtain the list of available add-on plans for the secondary wireless device. Such an API call can include a device type of the secondary wireless device. In some examples, the primary wireless device executes an API call to the carrier server to obtain a URL or post data for the websheet for the provider of the cellular plan. This API call can include an ICCID for the primary wireless device, an EID for the secondary wireless device, an IMEI for the secondary wireless device, or a device type of the secondary wireless device, or combinations of them, among others.

At 1108, the primary wireless device receives the enrollment information. The enrollment information can include a list of available add-on plans for the secondary wireless device or a websheet for a provider of the cellular plan. The primary wireless device transmits the enrollment information to the secondary wireless device (1110). In some examples, operations of the process 1100 include receiving a request to enroll the secondary wireless device in a selected add-on plan from the list of available add-on plans and, in response to the request, executing, by the primary wireless device, an API call to a carrier server to enroll the secondary wireless device in the selected add-on plan. Such an API can include an identifier for the selected add-on plan, an ICCID for the primary wireless device, an EID for the secondary wireless device, an IMEI for the secondary wireless device, or a device type of the secondary wireless device, or combinations of them, among others.

Figure 12:
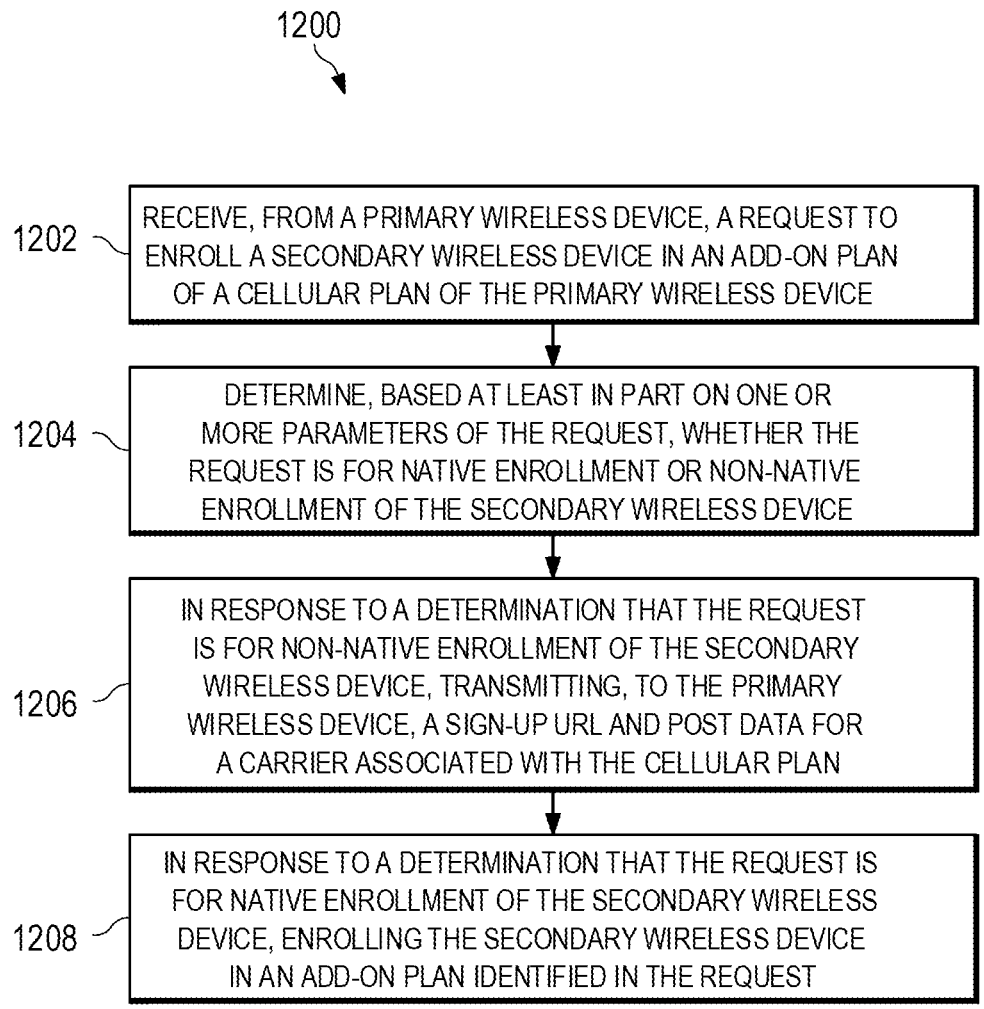

FIG. 12 illustrates a flowchart of another example process 1200 for on-device enrollment in a cellular add-on plan. In some examples, the electronic device(s), system(s), or component(s), or portions or implementations thereof, of FIGS. 1-9 are configured to perform the process 1200.

Operations of the process 1200 include receiving (e.g., at a carrier server and from a primary wireless device) a request to enroll a secondary wireless device in an add-on plan of a cellular plan of the primary wireless device (1202). Based at least in part on one or more parameters of the request, it is determined whether the request is for native enrollment or non-native enrollment of the secondary wireless device (1204). Determining whether the request is for native enrollment or non-native enrollment of the secondary wireless device can be based at least in part on the presence or absence of an add-on plan identifier in the request. For example, presence of the add-on plan identifier in the request is indicative of native enrollment (whereas absence of the add-on plan identifier is indicative of non-native or web sheet-based enrollment). In some examples, one or more parameters of the request can specify a value to indicate whether the request is for native enrollment or non-native enrollment. In some examples, the one or more parameters of the request include an ICCID of the primary wireless device, an EID of the secondary wireless device, an IMEI of the secondary wireless device, a device type for the secondary wireless device, or an add-on plan identifier, or combinations of them, among others.

In response to a determination that the request is for non-native enrollment of the secondary wireless device, a sign-up URL and post data for a carrier associated with the cellular plan is transmitted (e.g., by the carrier server) to the primary wireless device (1206). On the other hand, if it is determined that the request is for native enrollment of the secondary wireless device, the carrier server triggers enrollment of the secondary wireless device in an add-on plan identified in the request (1208). In some examples, enrolling the secondary wireless device in the add-on plan includes triggering installation of an eSIM profile on the secondary wireless device.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Figure 13:
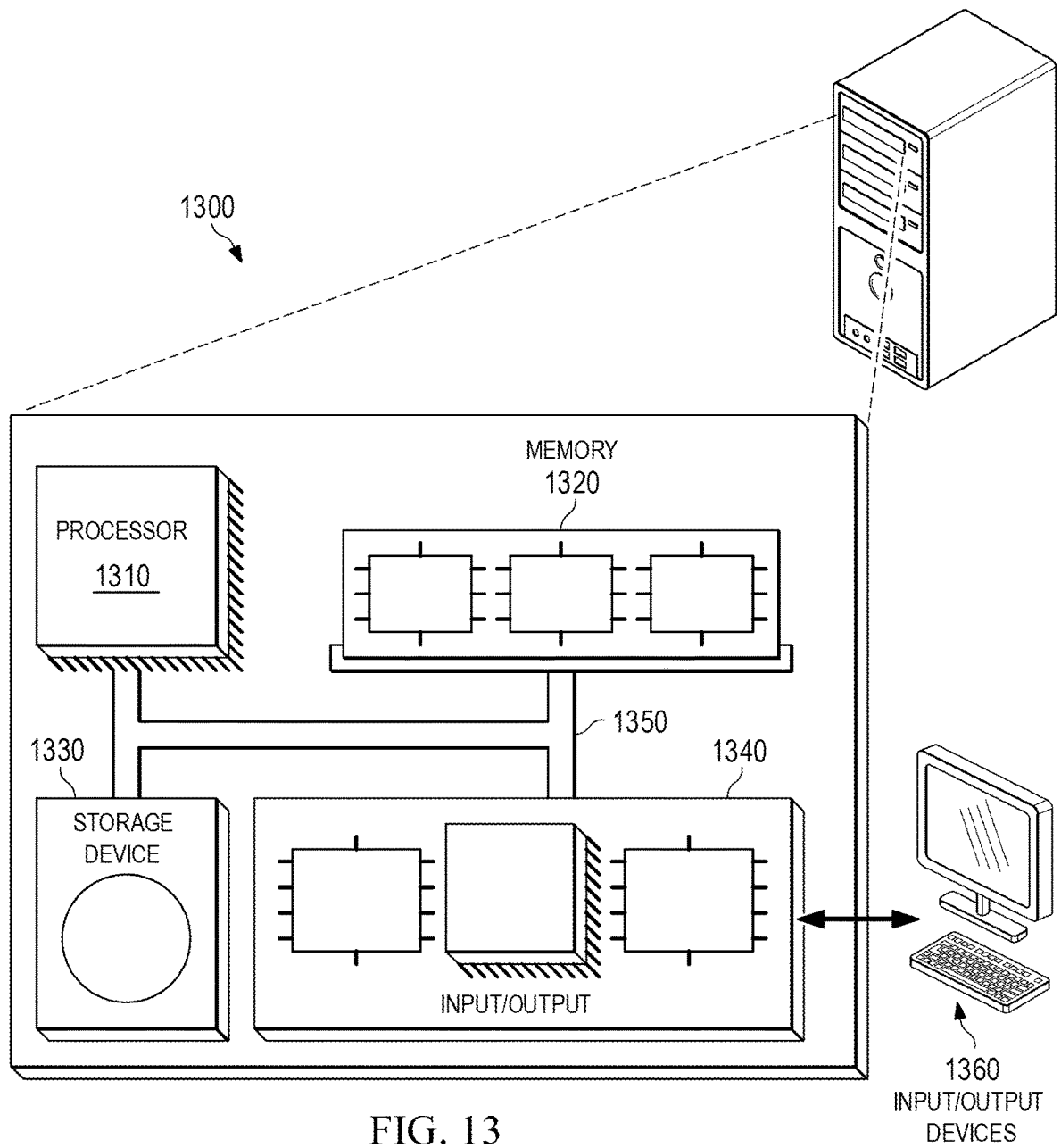
FIG. 13 illustrates an example computer system.

FIG. 13 is a block diagram of an example computer system 1300. For example, referring to FIG. 1, the primary wireless device 102, the secondary wireless device 104, the user account server 106, the carrier server 108, the discovery server 110, or the SM-DP+ server 112, or combinations of them, could be an example of the system 1300 described here, as could a computer system used by any of the users who access resources of these components. The system 1300 includes a processor 1310, a memory 1320, a storage device 1330, and one or more input/output interface devices 1340. Each of the components 1310, 1320, 1330, and 1340 can be interconnected, for example, using a system bus 1350.

The processor 1310 is capable of processing instructions for execution within the system 1300. The term "execution" as used here refers to a technique in which program code causes a processor to carry out one or more processor instructions. In some implementations, the processor 1310 is a single-threaded processor. In some implementations, the processor 1310 is a multi-threaded processor. The processor 1310 is capable of processing instructions stored in the memory 1320 or on the storage device 1330. The processor 1310 may execute operations such as those described with reference to FIGS. 10-12.

The memory 1320 stores information within the system 1300. In some implementations, the memory 1320 is a computer-readable medium. In some implementations, the memory 1320 is a volatile memory unit. In some implementations, the memory 1320 is a non-volatile memory unit.

The storage device 1330 is capable of providing mass storage for the system 1300. In some implementations, the storage device 1330 is a non-transitory computer-readable medium. In various different implementations, the storage device 1330 can include, for example, a hard disk device, an optical disk device, a solid-state drive, a flash drive, magnetic tape, or some other large capacity storage device. In some implementations, the storage device 1330 may be a cloud storage device, e.g., a logical storage device including one or more physical storage devices distributed on a network and accessed using a network. In some examples, the storage device may store long-term data. The input/output interface devices 1340 provide input/output operations for the system 1300. In some implementations, the input/output interface devices 1340 can include one or more of a network interface devices, e.g., an Ethernet interface, a serial communication device, e.g., an RS-232 interface, and/or a wireless interface device, e.g., an 802.11 interface, a 3G wireless modem, a 4G wireless modem, a 5G wireless modem, etc. A network interface device allows the system 1300 to communicate, for example, transmit and receive data. In some implementations, the input/output device can include driver devices configured to receive input data and send output data to other input/output devices, e.g., keyboard, printer and display devices 1360. In some implementations, mobile computing devices, mobile communication devices, and other devices can be used.

A server, such as the servers shown in FIG. 1, can be distributively implemented over a network, such as a server farm, or a set of widely distributed servers or can be implemented in a single virtual device that includes multiple distributed devices that operate in coordination with one another. For example, one of the devices can control the other devices, or the devices may operate under a set of coordinated rules or protocols, or the devices may be coordinated in another fashion. The coordinated operation of the multiple distributed devices presents the appearance of operating as a single device.

In some examples, the system 1300 is contained within a single integrated circuit package. A system 1300 of this kind, in which both a processor 1310 and one or more other components are contained within a single integrated circuit package and/or fabricated as a single integrated circuit, is sometimes called a microcontroller. In some implementations, the integrated circuit package includes pins that correspond to input/output ports, e.g., that can be used to communicate signals to and from one or more of the input/output interface devices 1340.

Although an example processing system has been described in FIG. 13, implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. In an example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "computing device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as standalone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/-R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

While this specification includes many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

What is claimed is:

1. A wireless device, comprising:
one or more processors configured to:
receive cellular plan information for a cellular plan of a primary wireless device associated with the wireless device;
based at least in part on the cellular plan information, display an option to add the wireless device to the cellular plan of the primary wireless device;
receive a selection of the option to add the wireless device to the cellular plan of the primary wireless device;
transmit a request to the primary wireless device for enrollment information for enrolling the wireless device in an add-on plan of the cellular plan; and
receive, from the primary wireless device, the enrollment information, wherein the enrollment information includes a list of available add-on plans for the wireless device or information associated with a provider of the cellular plan.

2. The device of claim 1, wherein the one or more processors are configured to:
receive user account information for a user account that is shared by the primary wireless device and the wireless device; and
retrieve the cellular plan information from a server based at least in part on the user account information.

3. The device of claim 1, wherein the cellular plan information includes a carrier of the cellular plan, a phone number of the primary wireless device, or eligibility information indicating that the wireless device is eligible to be added to the cellular plan of the primary wireless device.

4. The device of claim 1, wherein the one or more processors are configured to:
  display the list of available add-on plans;
  receive a selection of an add-on plan from the list of available add-on plans; and
  transmit a request to the primary wireless device to enroll the wireless device in the selected add-on plan.

5. The device of claim 4, wherein in response to receiving the selection of the add-on, the one or more processors are configured to display a prompt to a user to consent to enrollment of the wireless device in the selected add-on plan on the primary wireless device.

6. The device of claim 1, wherein the information associated with the provider of the cellular plan includes a websheet for the provider of the cellular plan, and wherein the one or more processors are configured to:
  display the websheet for the provider of the cellular plan; and
  in response to completion of the websheet, execute a callback function to trigger installation of an embedded subscriber identity module (eSIM) profile on the wireless device.

7. The device of claim 1, wherein the one or more processors are configured to:
  transmit a request to a server for the enrollment information for enrolling the wireless device in an add-on plan of the cellular plan, the request including at least some of the cellular plan information for the cellular plan of the primary wireless, wherein the server is configured to apply one or more business rules to determine whether the wireless device is eligible to be enrolled in the add-on plan of the cellular plan; and
  receive, from the server, the enrollment information.

8. The device of claim 1, wherein the one or more processors are configured to:
  receive a filtered list of available add-on plans for the wireless device produced by applying one or more filters to the list of available add-on plans, wherein the one or more filters include a filter based on a freshness of the primary wireless device or a filter based on an active cellular plan of the primary wireless device; and
  display the filtered list of available add-on plans.

9. The device of claim 1, wherein after enrollment of the wireless device in an add-on plan of the cellular plan, the one or more processors are configured to:
  transmit a request to a server for account information for the add-on plan; and
  receive, from the server, the account information, wherein the account information includes an indication of data usage for the add-on plan or information to access an account with a provider of the add-on plan.

10. A wireless device, comprising:
  one or more processors configured to:
    transmit cellular plan information for a cellular plan of the wireless device to a server, the wireless device being associated with a secondary wireless device;
    receive a request for enrollment information for enrolling the secondary wireless device in an add-on plan of the cellular plan;
    transmit a request to a server for the enrollment information;
    receive the enrollment information, wherein the enrollment information includes a list of available add-on plans for the secondary wireless device or information associated with a provider of the cellular plan; and
    transmit the enrollment information to the secondary wireless device.

11. The device of claim 10, wherein the one or more processors are configured to:
  receive user account information for a user account that is shared by the wireless device and the secondary wireless device; and
  transmit the cellular plan information to a server, wherein the secondary wireless device is configured to retrieve the cellular plan information from the server based at least in part on the user account information.

12. The device of claim 10, wherein the cellular plan information includes a carrier of the cellular plan or a phone number of the wireless device.

13. The device of claim 10, wherein the one or more processors are configured to execute one or more application programming interface (API) calls to a carrier server obtain eligibility information indicating that the secondary wireless device is eligible to be added to the cellular plan of the wireless device.

14. The device of claim 10, wherein in response to the request for the enrollment information, the one or more processors are configured to execute an application programming interface (API) call to a carrier server to obtain the list of available add-on plans for the secondary wireless device.

15. The device of claim 10, wherein the information associated with the provider of the cellular plan includes a websheet for the provider of the cellular plan, and wherein in response to the request for the enrollment information, the one or more processors are configured to execute an application programming interface (API) call to a carrier server to obtain a URL or post data for the websheet for the provider of the cellular plan.

16. The device of claim 10, wherein the one or more processors are configured to:
  receive a request to enroll the secondary wireless device in a selected add-on plan from the list of available add-on plans; and
  in response to the request, execute an application programming interface (API) call to a carrier server to enroll the secondary wireless device in the selected add-on plan.

17. A method, comprising:
  receiving, from a primary wireless device, a request to enroll a secondary wireless device in an add-on plan of a cellular plan of the primary wireless device;
  determining, based at least in part on one or more parameters of the request, whether the request is for native enrollment or non-native enrollment of the secondary wireless device; and
  in response to a determination that the request is for non-native enrollment of the secondary wireless device, transmitting, to the primary wireless device, a sign-up URL and post data for a carrier associated with the cellular plan.

18. The method of claim 17, further comprising:
  in response to a determination that the request is for native enrollment of the secondary wireless device, enrolling the secondary wireless device in an add-on plan identified in the request.

19. The method of claim 17, further comprising:
  determining whether the request is for native enrollment or non-native enrollment of the secondary wireless device based at least in part on presence or absence of an add-on plan identifier in the request, wherein the presence of the add-on plan identifier in the request is indicative of native enrollment.

20. The method of claim 17, wherein the one or more parameters of the request include an integrated circuit card identifier (ICCID) of the primary wireless device, an embedded identity document (EID) of the secondary wireless device, an international mobile equipment identity (IMEI) of the secondary wireless device, a device type for the secondary wireless device, or an add-on plan identifier.

* * * * *